(12) United States Patent
Sahu et al.

(10) Patent No.: US 12,499,267 B2
(45) Date of Patent: Dec. 16, 2025

(54) MULTI-LAYERED, MULTI-PATHED APPARATUS, SYSTEM, AND METHOD OF USING COGNOSCIBLE COMPUTING ENGINE (CCE) FOR AUTOMATIC DECISIONING ON SENSITIVE, CONFIDENTIAL AND PERSONAL DATA

(71) Applicant: Data Safeguard, Inc., Santa Clara, CA (US)

(72) Inventors: Sudhir Ranjan Sahu, Mountain View, CA (US); Elliott Lowen, Walnut Creek, CA (US); Lee Nocon, Apple Valley, MN (US); Praful Parekh, San Jose, CA (US); Sumeet Rajesh Shah, Pune (IN); Swarnam Dash, San Jose, CA (US); Keertana Suresh, San Jose, CA (US)

(73) Assignee: Data Safeguard, Inc., Santa Clara, CA (US)

( * ) Notice: Subject to any disclaimer, the term of this patent is extended or adjusted under 35 U.S.C. 154(b) by 265 days.

(21) Appl. No.: 18/049,573

(22) Filed: Oct. 25, 2022

(65) Prior Publication Data

US 2023/0128136 A1   Apr. 27, 2023

Related U.S. Application Data

(60) Provisional application No. 63/271,502, filed on Oct. 25, 2021.

(51) Int. Cl.
H04L 29/06       (2006.01)
G06F 16/41       (2019.01)
G06F 21/62       (2013.01)

(52) U.S. Cl.
CPC .......... *G06F 21/6245* (2013.01); *G06F 16/41* (2019.01)

(58) Field of Classification Search
CPC ............................ G06F 21/6245; G06F 16/41
See application file for complete search history.

(56) References Cited

U.S. PATENT DOCUMENTS

| 7,711,749 | B2 | 5/2010 | Brodie |
| 8,561,185 | B1 | 10/2013 | Muthusrinivasan |
| 9,582,680 | B2 | 2/2017 | Bilodeau |
| 10,043,035 | B2 | 8/2018 | LaFever |

(Continued)

FOREIGN PATENT DOCUMENTS

| CN | 103714018 A | 4/2014 |
| WO | 2021201880 A1 | 10/2021 |

OTHER PUBLICATIONS

International Search Report and Written Opinion for PCT/US22/78669 filed Oct. 25, 2022, mailed Feb. 1, 2023, 13 pgs.

(Continued)

*Primary Examiner* — Jason K Gee
(74) *Attorney, Agent, or Firm* — Patent Law Works LLP

(57) ABSTRACT

A computer-implemented apparatus, system, and method is disclosed for protecting sensitive data. A cognoscible computing engine is multi-layered and multi-pathed. It includes features for handling different data formats, including structured, semi-structured, and unstructured data. Features are included to support near real-time processing at scale with high accuracy. Applications include redacting or masking sensitive data to comply with data privacy and security standards.

25 Claims, 27 Drawing Sheets

(56) References Cited

U.S. PATENT DOCUMENTS

| | | | |
|---|---|---|---|
| 10,885,225 B2 | 1/2021 | Balzer | |
| 10,970,414 B1 | 4/2021 | Lesner | |
| 11,704,431 B2 * | 7/2023 | Kraus | H04L 63/0414 |
| | | | 726/26 |
| 2006/0143459 A1 | 6/2006 | Villaron | |
| 2011/0239113 A1 | 9/2011 | Hung | |
| 2015/0213288 A1 | 7/2015 | Bilodeau | |
| 2015/0318998 A1 * | 11/2015 | Erlikhman | H04L 63/0853 |
| | | | 713/171 |
| 2016/0239668 A1 | 8/2016 | Bellert | |
| 2017/0249466 A1 | 8/2017 | Ben-Yair | |
| 2018/0232528 A1 * | 8/2018 | Williamson | G06F 21/6245 |
| 2019/0138748 A1 | 5/2019 | Long | |
| 2019/0364154 A1 | 11/2019 | Hermanek | |
| 2019/0377900 A1 | 12/2019 | Balzer | |
| 2019/0377901 A1 | 12/2019 | Balzer | |
| 2021/0026872 A1 * | 1/2021 | Saillet | G06F 16/248 |
| 2022/0035946 A1 * | 2/2022 | Barday | G06F 11/3476 |
| 2022/0043927 A1 * | 2/2022 | Sofer | G06F 21/6218 |
| 2023/0120348 A1 * | 4/2023 | Rosado | G06F 40/166 |
| | | | 726/26 |

OTHER PUBLICATIONS

International Preliminary Report on Patentability for PCT/US2022/078669, mailed May 10, 2024, 8 pgs.

* cited by examiner

FinTech Sector:
1. PayPal/Venmo/Square/Zelle
2. Facebook/What's App/WeChat

Government Sector:
1. SSN Benefits
2. Widow Benefits
3. Military Services Benefits Credit Bureau:
Identify and remove Frankenstein Identities
Identify and stop new Frankenstein Identities Corporate Fraud:
1. Shell Companies [Financial-(KYC/AML), Terrorism]

Fig. 17C

MULTI-LAYERED, MULTI-PATHED APPARATUS, SYSTEM, AND METHOD OF USING COGNOSCIBLE COMPUTING ENGINE (CCE) FOR AUTOMATIC DECISIONING ON SENSITIVE, CONFIDENTIAL AND PERSONAL DATA

CROSS REFERENCE TO RELATED APPLICATIONS

This application claims the benefit of U.S. Provisional Application No. 63/271,502, filed Oct. 25, 2021, entitled "Cognitive Computing Engine System and Method", which is incorporated herein by reference in its entirety.

FIELD OF THE INVENTION

The present disclosure generally relates to automatically detecting sensitive data. More particularly, the present disclosure is related to a computing engine for automatically detecting sensitive data.

BACKGROUND

Protection of sensitive information is an important issue. There are a variety of legal mandates, regulatory requirements, and other requirements for the protection of sensitive information. Organizations today are challenged by the form in which the sensitive data comes to their systems and databases. Sometimes it is structured, unstructured and semi-structured and sometimes it is part of program, application code flow, etc. In addition to that, scaling up solutions is a big challenge.

There are 4 common challenges in identifying the sensitive information. First, the volume of data owned by organizations is growing daily. This makes managing sensitive data a huge challenge. Second, it is estimated that close to 80%-90% of many types of sensitive data will be unstructured in the next couple of years. Third, a recent study by Forbes showed that almost 95% of the businesses today struggle with managing unstructured data. Fourth, there have been an increasing number of incidents of data breaches.

Sensitive data can be in a structured format, a semi structured format, as well as in unstructured format. Some types of data are sensitive by itself. Other types of data are sensitive in the context of some types of combinations of data. Sensitive data can be categorized into 5 basic types:
1. PII—personally identifiable information (Name, Email, Phone, data of birth (DOB), Address)
2. SPI—Sensitive personal information (Social Security Number (SSN), primary account number (PAN), Driver's License (DL), PASSPORT information (e.g., Passport ID number))
3. PHI—protected health information (Medical ID, Medical Report)
4. NPI—Non-public personal information (Credit Card (CC) Number, Bank Account Number)
5. PAI—Publicly available Information (PAI) joined together to uniquely identify an individual or information related to the individual. A subset of PII that, if lost, compromised, or disclosed without authorization could result in substantial harm, embarrassment, inconvenience, or unfairness to an individual.

The conventional process of identifying sensitive and PII data is inadequate in that there is no previous system or method that takes care of the whole process in a fully automated fashion, with the type of high accuracy and high speed necessary in many end use applications. This is demonstrated by the fact that there have been famous data breach events of sensitive data. Such data breeches have been one of the biggest hindrances to the adoption of the cloud amongst customers and client. In particular, many customers and clients have been resistant to using the cloud to store data.

SUMMARY

The present disclosure relates to a multi-layered, multi-pathed system, method, and service for using a cognoscible computing engine to systematically parse incoming data in any form, detect the relevant information, identify and classify the information, confirm if the information is accurate, then tag, flag and take appropriate information as deemed to be relevant as per the configuration. The cognoscible computing engine may be used as a part of a cloud-based service, an enterprise-based service, etc. The cognoscible computing engine may be used to support a variety of end-uses, such as masking, redaction, compliance with sensitive data standards, and a variety of different types of fraud detection and prevention, as a few of many examples.

In one implementation of an apparatus, a cognoscible computing engine is a multi-layered and multi-pathed computing engine which includes a data source identifier including a parser and data extractor to classify ingested data, identify metadata, schema, and database types for structured data, semi-structured data, and unstructured data types, the data source identifier indexing and storing the extracted data. A detection module includes a semantic rules engine and an ensemble of artificial intelligence models configured to perform context-based classification. An identification module receives detected data attributes output by the detection module and invokes identification markers to generate sensitive data identification information. A confirmation module confirms the sensitive data identification information utilizing the context information to associate data elements and confirm the presence of sensitive data elements. a data tagging and classification module tags sensitive data.

In one implementation, the detection module is configured to perform entity classification, determine and classify entity protocols, and apply the semantic rules engine to generate an output for the ensemble of artificial intelligence models configured to perform context-based classification.

In one implementation, the computing engine comprises control access instructions to vector encapsulate functions to be applied to a raw data file. In one implementation the control access instructions include functions to transform a metadata configuration file to a metafile matrix to configure a workflow. In one implementation, the control access instructions include instructions for Governance policies, Enterprise attributes, system initialization config files, and OAuth config files.

In one implementation, a configurable UI is provided to configure graphical user interfaces, browsers, authorization levels and different reporting use cases.

In one implementation, the detection module analyzes parts of speech, noun phrases, verb phrases and dependency parsing signals generated by a natural language processing framework.

In one implementation, the detection module comprises a context builder to build a context for recognized named entity based at least in part on the control access instructions, role detection, action-intent detection, and rule-based persona. In one implementation, the context builder prepares context training data to train an AI/machine model. In one implementation, the context builder trains an AI/ML model to perform context prediction.

In one implementation, the semantic rule engine identifies a set of rules for the ensemble of artificial intelligence models based at least in part on entity classification and entity protocol determination and classification.

In one implementation, the apparatus tracks data lineage between ingested data and distributed data.

In one application, the detection module analyzes the syntactic, semantic, and morphological elements to be incorporated to identify entities.

In one implementation, the parser is configured to parse data sources including video and GIF files, audio and speech files, PNG and JPEG image files, textual files, and database tables.

In one implementation, a masking engine is provided to mask tagged sensitive data.

In one implementation, the tagging and classification module identifies sensitive data to be redacted.

In one implementation, the apparatus is configurable to mask sensitive data.

In one implementation, the apparatus is configurable to redact sensitive data.

In one implementation, a compliance engine is provided to monitor compliance with at least one data privacy, security, or protection protocol.

In one implementation, the computing engine protects at least one of on-premises data and cloud application data.

An example of a method includes receiving control access instructions. Configuration UI preferences are received. The method parses, extracts, classifies, and indexes ingested data to identify metadata, schema, and database types. This may be performed for different data types, such as structured data, semi-structured data, and unformatted data. Contextual relationships are built of keywords and context-based classification is performed to detect data attributes indicative of data sources, entities, context, and potential instances of sensitive data. Identification markers are invoked to mark sensitive data. The identification of sensitive data is confirmed. This may include utilizing context information to confirm the presence of sensitive data. In one implementation, an internal test and an external test are performed, and both tests used in combination to confirm the identification of sensitive data. The sensitive data is tagged and classified.

In one implementation, the method includes performing entity classification, determining and classifying entity protocols, and applying a semantic rules engine to generate an output for an ensemble of artificial intelligence models configured to perform context-based classification.

In one implementation, the method comprises utilizing control access instructions to vector encapsulate functions to be applied to a raw data file.

In one implementation, the method includes setting, via the configurable UI, authorization levels and different reporting use cases.

In one implementation, the detecting includes analyzing parts of speech, noun phrases, verb phrases and dependency parsing signals generated by a natural language processing framework.

In one implementation, the detecting includes building a context for recognized named entity based at least in part on the control access instructions, role detection, action-intent detection, and rule-based persona. In one implementation, the method includes preparing context training data to train an AI/machine model. In one implementation, the context builder trains an AI/ML model to perform context prediction.

In one implementation, the method includes utilizing a semantic rule engine which identifies a set of rules for the ensemble of artificial intelligence models based at least in part on entity classification and entity protocol determination and classification.

In one implementation, the method includes tracking data lineage between ingested data and distributed data.

In one application, the method includes analyzing the syntactic, semantic, and morphological elements to be incorporated to identify entities.

In one implementation, the method includes using a parser to parse data sources including video and GIF files, audio and speech files, PNG and JPEG image files, textual files, and database tables.

In one implementation, the method further includes masking tagged sensitive data.

In one implementation, the method includes identifying sensitive data to be redacted.

In one implementation, the method further includes monitoring compliance with at least one data privacy, security, or protection protocol.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

FIG. 17C illustrates examples of use sectors for the synthetic fraud application of FIG. 17A.

DETAILED DESCRIPTION

Figure 1:
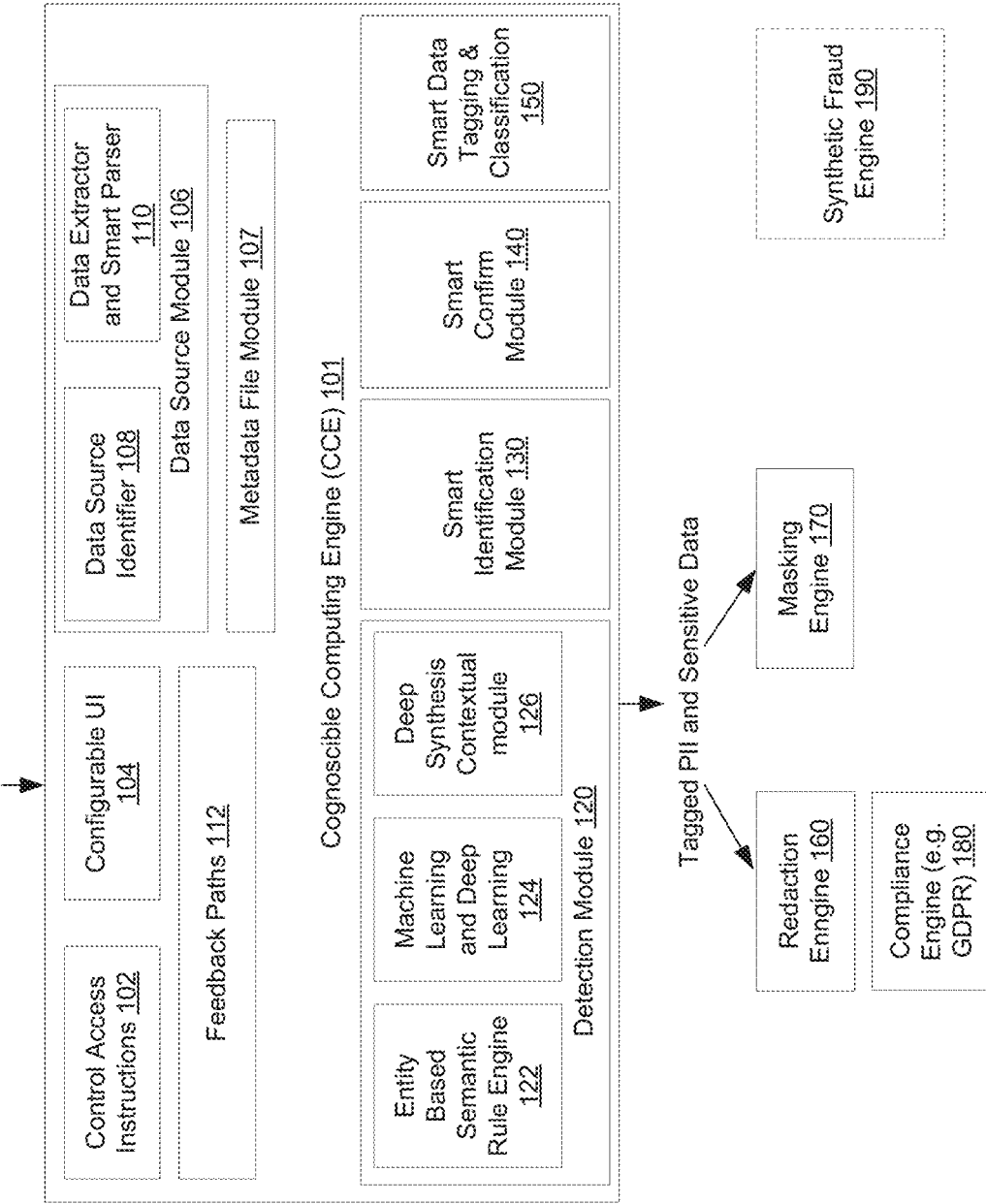
FIG. 1 is a block diagram illustrating a cognoscible computing engine in accordance with an implementation.

Referring to FIG. 1, the present disclosure describes an apparatus, system, and method for identifying sensitive data using a cognoscible computing engine (CCE) 101 to systematically parse incoming data in a wide variety of forms (e.g., all common forms used by enterprises, such as structured, semi-structured, and unstructured documents), detect the relevant information, identify and classify the information, confirm if the information is accurate, then tag, flag and take appropriate information as deemed to be relevant as per the configuration. The classification process may include labeling data into categories. A commercial implementation of the cognoscible computing engine by the Applicant of the present disclosure has the trademarked name CCE®.

The CCE 101 may include models and algorithms optimized to take advantage of data accelerators with parallel processing capabilities. Some individual modules of CCE 101 may use natural language processing (NLP) and machine learning (ML), such as neural networks, deep learning, and related artificial intelligence techniques.

The output of the CCE 101 may also be used by a masking engine 170 or a redaction engine 160. In one implementation, a redaction engine 160 identifies and redacts sensitive and personal data in unstructured, semi-structured, and structured data sources. The redaction engine 160 may aid in ensuring compliance (e.g., standards, laws, and regulations for sensitive data such as compliance with the General Data Protection Regulation (GDPR), compliance with NIST standards for protecting data, compliance with state privacy acts such as the Californica Consumer Privacy Act (CCPA), compliance with Payment Card Industry (PCI) standards, and compliance with the Health Insurance Portability and Accountability Act (HIPPA). As discussed in more detail, a compliance engine 180 may be provided to ensure compliance with one or more sensitive data compliance standards, laws, or regulations.

The CCE 101 may also optionally be used as part of a larger solution that includes a synthetic fraud engine 190, which will be described later.

In one implementation, the CCE 101 is multi-layered and multi-pathed. The CCE 101 may be implemented as computer program instructions executed on a computer server or other computing device. The CCE 101 may be implemented with Artificial Intelligence (AI)/machine learning (ML) models, which may include, for example, Long Short-Term Memory (LSTM) embedded deep neural networks, convolutional neural network (CNN), and deep learning (DL). In some implementations, the CCE 101 includes a bi-directional deep neural network. The CCE 101 includes a lexical parser to parse data from different sources. NLP techniques may also be utilized for some aspects of lexical parsing and validation, such as a Bi-directional Encoder Representations from Transformers (BERT).

Referring to FIG. 1, the major functional blocks of a CCE 100 are illustrated, including a detection module 120, identification module 130 confirmation module 140, feedback modules 112, and tagging and classification module 120. As further illustrated in FIG. 2, some other modules include a data source module 106, to receive inputs from on premise/cloud applications 191A, 191B online or in batches. A metadata module 107 may be included to support generating the metadata needed for downstream modules. In one implementation, the metadata module 107 helps to retrieve relevant information about the data received from the data source module. As an example, if the data is a specific file format (e.g., ".csv") then the metadata module 107 retrieves metadata based on the file format, such as "column names", "file modified date", etc. Other processing, storage, and consumption modules may be included, such as a cloud/on premise processing module 193, a cloud/on premise storage module 195, and a consumption layer 197.

As an illustrative but non-limiting example, the CCE 101 may be used for the detection of sensitive data elements from a large collection of corpuses of unstructured documents, web logs, configurations, and structured data sources. The CCE 101 has a Detection-Identification-Confirmation-Tagging (DICT) architecture with a detection module 120 identification module 130, confirmation module 140, and tagging & classification module 150 organized such that the CCE 101 is multi-layered and multi-pathed. In one implementation, the detection module 120 includes an ensemble of artificial intelligence-based methods as well as a business rules engine, which makes the detection module multi-layered. The identification module 130 takes a multi-pathed approach in recognizing each sensitive information and distinctly differentiates it from other sensitive data points.

In one implementation, the CCE 101 uses a combination of computer processing, data processing, workflows, and algorithms to systematically automate parsing, detecting, identifying, confirming, verifying, tagging, flagging, tokenizing, and tracking defined sensitive and confidential information within unstructured, semi-structured and structured data constructs.

In some implementations, the CCE 101 has the capability to register data lineage (DL), data depth (DD) and data consistency (DC) in making a decision on the sensitive data entity by adding a confidence layer over various data stores, data bases, data warehouses, data lakes, and data lake houses.

In one implementation, the method, apparatus, and system automate the selection and building of artificial intelligence and machine learning models based on different access control configurations compiled from various sources to efficiently operate on very high volumes of data in near real-time with hyper-accuracy of matching run-time data with trained, defined sensitive and confidential information and access controls.

The CCE 101 has modules that process information in a systematic way. When the client wants to access the CCE 101 in their environment, the CCE 101 first invokes the data source module 106 in order to perform various forms of data pre-processing to understand the metadata, schema, and type of databases involved. The data source module 106 finds the configuration of the CCE 101 from control access instructions 102, and the metadata extraction happens. The extracted data entity elements go through a series of logic and modelling interventions in a detection module 120, identification module 130, confirmation module 140, and finally at the tagging & classification module 150. The combination of all the modules presents within the CCE 101 and their operation makes it multi-pathed and multi-layered.

One aspect is that in one implementation the modules of the CCE 101 are connected via the feedback modules 112 in such a way to support components feeding back and receiving information from other modules. The CCE 101 is highly comprehensive in receiving feedback and incorporating feedback between modules. The overall architecture of the CCE 101 is a multi-layered and multi-pathed approach to detect, identify, confirm, and tag the sensitive information from mountains of information not limited to structured data only, process at hyper scale and accuracy, and provide near real time results.

The CCE 101 includes modules for sensitive/confidential data detection such as a detection module 120, an identification module 130, a confirmation module 140, and a data tagging and classification module 150. This corresponds to detection, identification, confirmation, and tagging (DICT). Other modules and features may be included to support high volume and accurate analysis of sensitive/confidential data from a variety of different source and data types, such as a data source module 106, a feedback module 112, and a metadata module 107 to process/provide metadata files for use in DICT.

Some examples of features in the example implementation of FIG. 1 include one or more of the following features:
1. Control access instructions 102. The control access instructions 102 are the operational method instructions that are part of a control algorithm constructed such that the model may adapt to changes in time and with changes in attributes. In one implementation, a methods vector encapsulates a broad array of functions applied to the raw data file (RDF) for a desired output. It contains functions for transforming a Meta config file to a Metafile matrix based on a workflow configuration, data owner preferences (account matrix), governance policies, enterprise attributes, system initialization configuration files, and an OAuth configuration file, which are also transformed into their respective matrices. In one implementation, the control access instructions include at least one of global access control instructions, enterprise access control instructions, system access control instructions, and open authentication control access instructions. In one implementation, the application of the methods vector and associate matrices and the order, iterations, priorities, and weightages for optimal performance are determined by the control algorithm of CCE 101.
2. Configurable UI 104. A reporting vector of the CCE 101 represents various configurations for graphical user interfaces, browsers, authorization levels and different reporting use cases. The reporting vector may also contain metadata for various data source connections, with addresses and credentials. The reporting vectors may contain vectors for processing the data for a thick client with a heavy graphical user interface (GUI), or a lighter version of the GUI for a web browser.
3. A data source module 106 with sub-components implementing the functionality of a data source identifier 108 and data extractor and smart parser 110. Data can be from various sources such as structured tables, unstructured sources including the PDFs, DOCs, Text files, email interactions, conversational chat platforms and also from web logs. Sensitive information can also be in the form of images, audio snippets and video and GIFs. Different data sources have their own schema that need to be understood to correctly understand the data. In one implementation, the subcomponents of data source module 106 include a schema reader that is intelligent enough to identify the data source. The data extraction happens based on attributes such as keywords from text documents, data entities from the tables, text and image from the presentations, emails etc. The data extractor and smart parsing module 110 classifies the extracted information and pushes that to the storage layer after indexing the information.
4. Entity based semantic rule engine 122: A detection module 120 may include an entity based semantic rule engine that works on parts of speech, noun phrases, verb phrases and dependency parsing signals generated by natural language processing (NLP) framework. In one implementation, the syntactic, semantic, and morphological elements are incorporated to identify the entities better.
5. Machine Learning and Deep Learning Module 124. One or more of the modules, such as the detection module 120, may include a combination of machine learning, deep learning models and pre-trained transformer-based models to recognize the entities and perform other functions in the DICT architecture
6. Deep Synthesis Contextual Module 126. The context is a combination of various keywords that are needed to convey a message. The function of the Deep Synthesis Contextual Module is to establish connected information that can help in the DICT process in identifying contextual relationships associated with entities and sensitive information. In one implementation, context is built up, context-based classifications are performed, and context predictions are generated as part of DICT process.
7. Smart Confirmation module 140. The smart confirmation module 140 uses the context and associated data elements to confirm the presence of sensitive data.
8. Data tagging and classification module 150. The data tagging and classification module 150 supports tagging, and classification of sensitive information is implemented based on the pre-populated control flow access and exposed to the relevant stakeholders through a configurable UI.

The CCE 101 may be implemented in different ways, such as on-premises within a network server of an enterprise network of an organization receiving, storing, processing, or managing sensitive data. The CCE 101 may also be provided as an internet or network-based service. The CCE 101 may also be implemented to support cloud-based applications. In one implementation, the CCE 101 is used to address the issue of sensitive data for one or both of on-premises and cloud-based applications.

Figure 2:
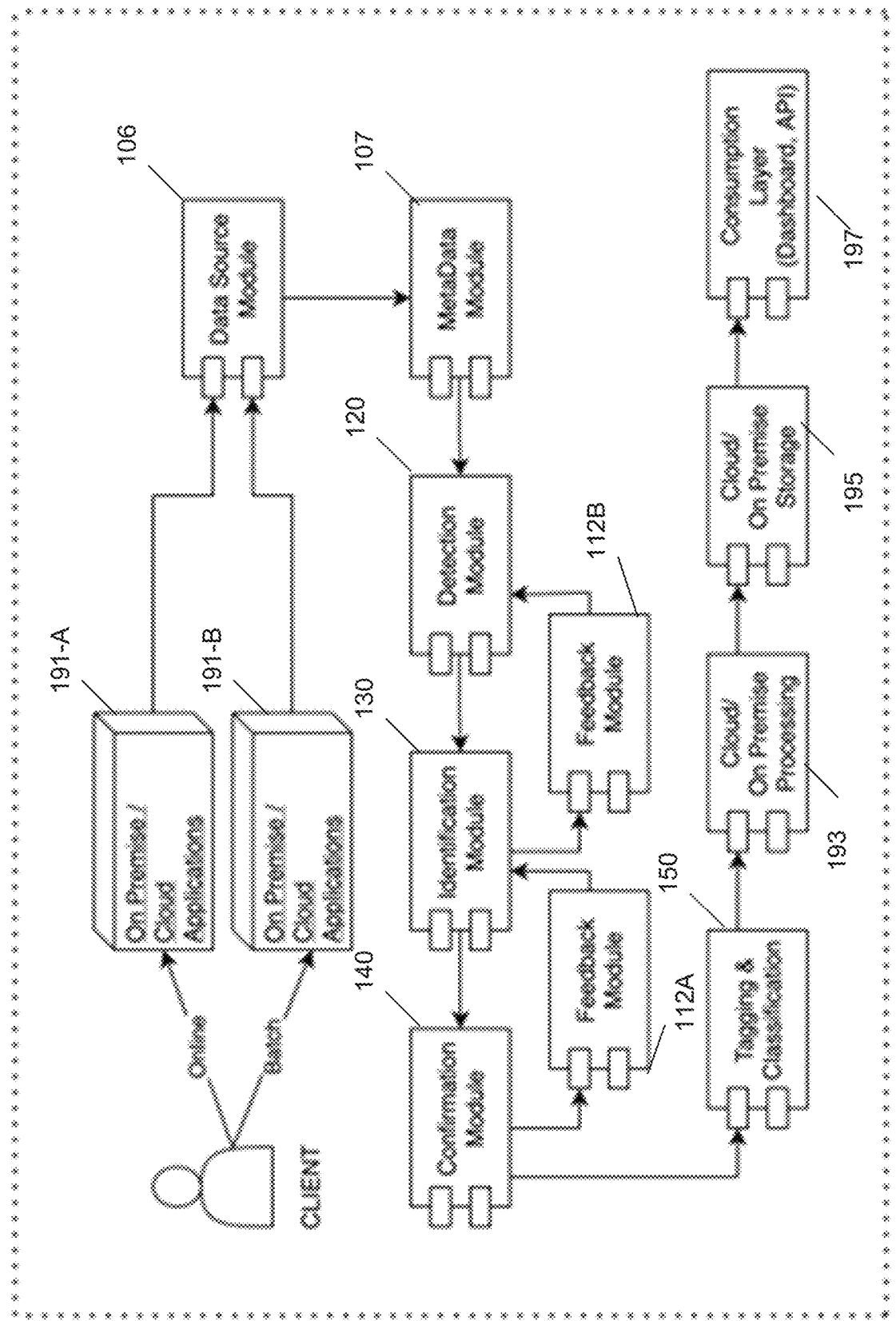
FIG. 2 is a block diagram illustrating a cognoscible computing engine and a flow of processing between major modules in accordance with an implementation.

FIG. 2 illustrates an example set of modules of the CCE 101 and example processing, and data flows illustrated by the arrows for a data source module 106, metadata module 107, detection module 120, identification module 130, confirmation module 140, and tagging and classification module 150. An example of additional modules for on-premises and cloud applications is also illustrated. For example, the source of data to be analyzed may include online or batch data from either on-premises or cloud applications 191-A and 191-B. Additional modules may be included, such as modules for cloud/on-premises processing 193, cloud/on-premise storage 195, and a consumption layer 197, such as a dashboard or API.

Figure 3:
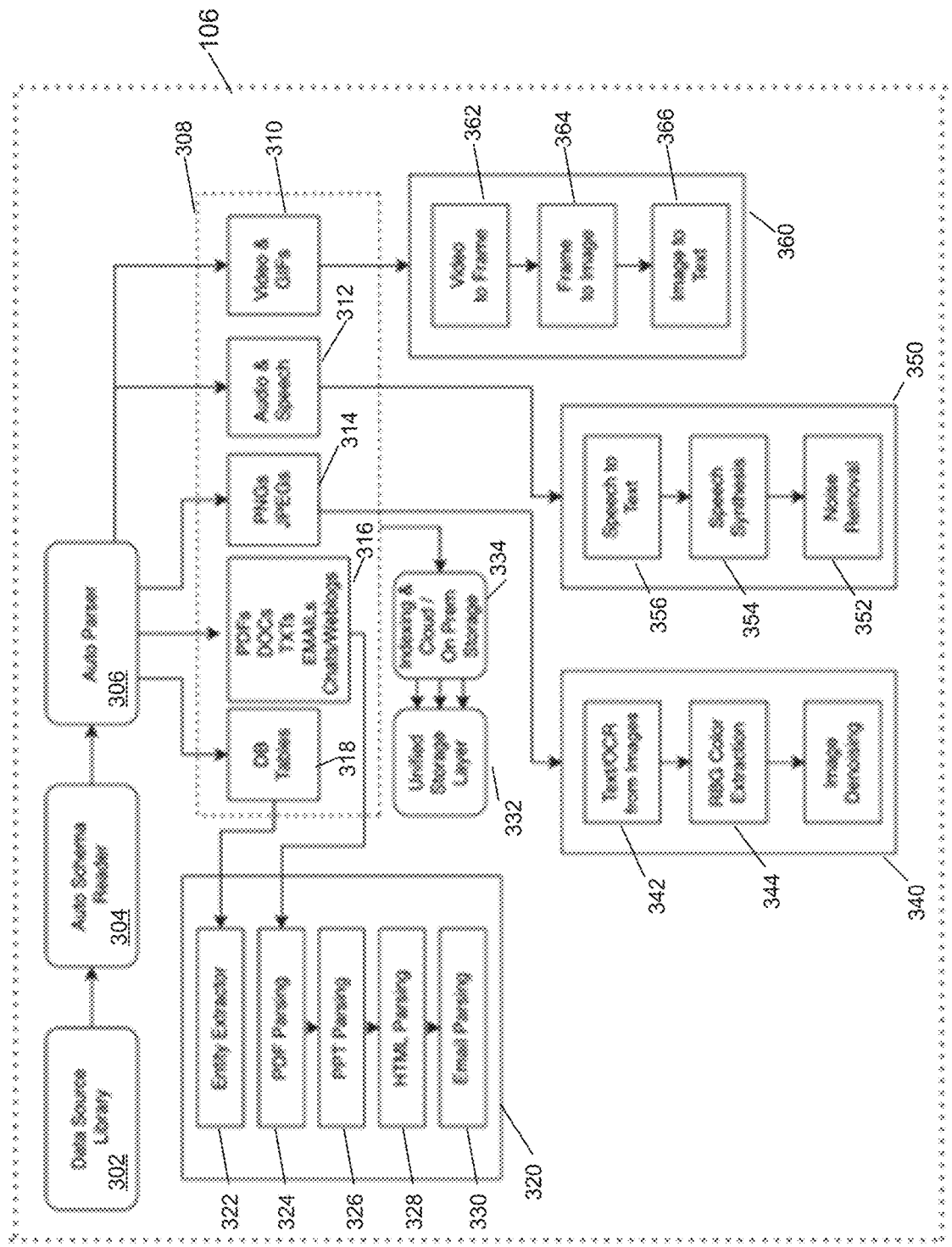
FIG. 3 illustrates an example of a data source module in accordance with an implementation.

FIG. 3 illustrates an example of an implementation of the data source module 106. The data source module 106 is invoked in order to understand the metadata, schema and type of databases involved. The data source module 106 may include smart auto parsing and data extraction to deal with the fact that a wide variety of structured, semi-structured, and unstructured data sources may be processed by the CCE 101.

In one implementation, data from a data source library 302 is read by an auto schema reader 304 and the output received by auto parser 306. The auto parser 306 identifies the data type for subsequent processing queues, such as by way of example but not limitation, videos & Graphics Interchange Format (GIF) files 308; audio & speech 312; Portable Network Graphics (PNG) files and Joint Photographic Expert Group (JPEG) format files 314; Portable Document Format (PDF) files, Word process document format files (DOCs), text files (TXTs), Emails, Chats/Weblogs 316; and database tables 318. These are illustrative but non-limiting examples to illustrate that a wide variety of data sources can be handled. Video & GIFs may be processed in module 360 using a video to frame module 362, frame to image module 364, and image to text module 366. Audio & Speech may be processed in module 350 using speech to text 352, speech synthesis 354, and noise removal 356. PNGs and JPEGs may be processed in module 340 with text optical character recognition (OCR) from images 342, red-blue-green (RBG) color extraction 344, and image denoising 346. In module 320, database tables may be processed by an entity extractor 322. PDF parsing 324, PowerPoint (PPT) parsing 326, Hypertext Markup Language (HTML) parsing 328, and email parsing 330 may be used to process PDFs, DOCs, TXTs, emails, chats/weblogs.

FIG. 3 also illustrates indexing and cloud/on premise storage 334 into a unified storage layer 332. It will be understood that while FIG. 3 provides a particular example of different types of structured, semi-structured, and unstructured data source, the basic approach may be varied or extended to encompass a wide variety of data sources.

Figure 4:
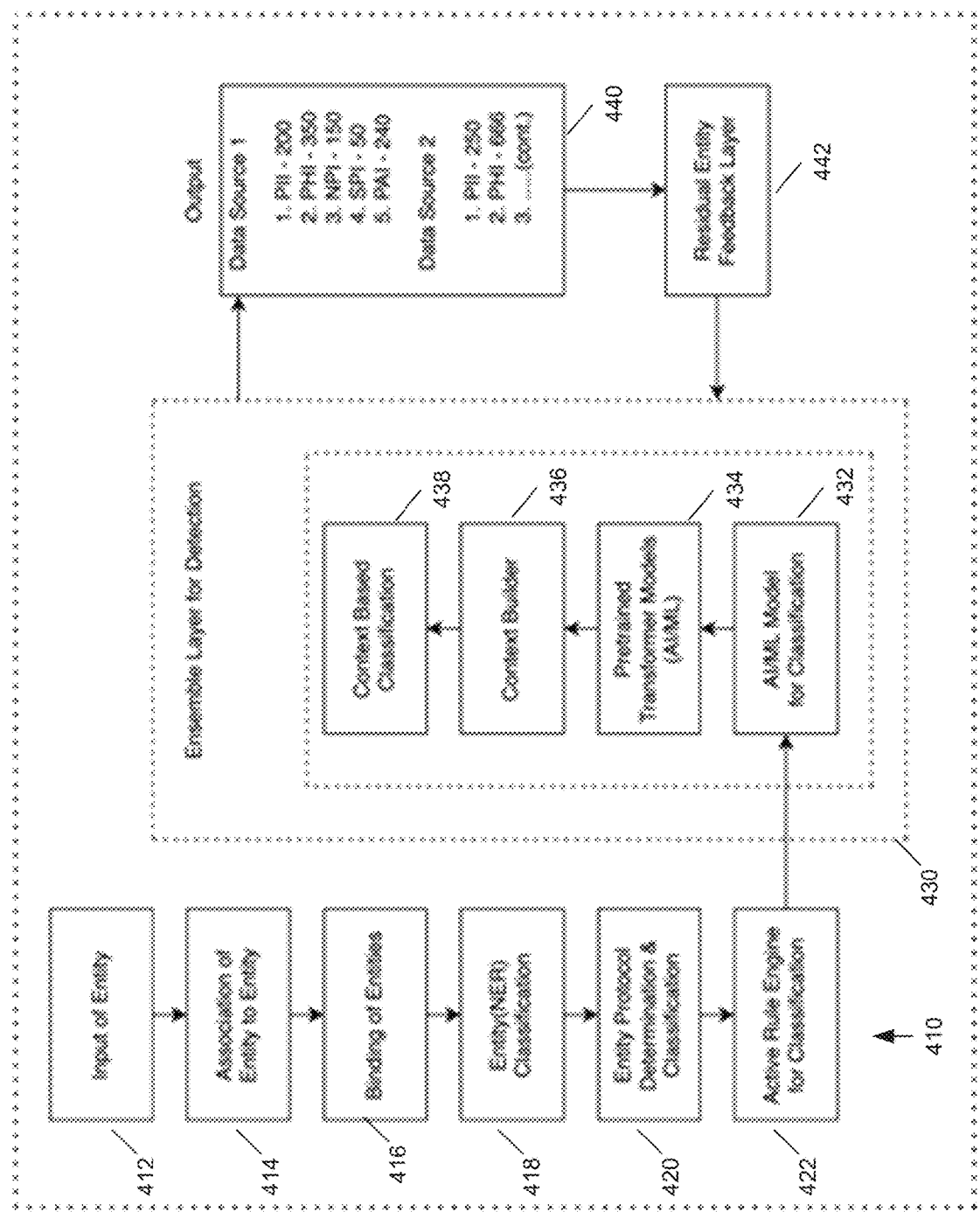
FIG. 4 is a flow chart of an example of a data source module in accordance with an implementation.

FIG. 4 illustrates an example implementation of the detection module 120 that includes an entity based semantic rule engine. The detection module 120 utilizes a combination of an ensemble of artificial intelligence-based methods 430 as well as entity based semantic business rules engine-based method 410, which makes the detection module multi-layered. Referring first to the entity based semantic business rules engine, the entity is input in block 412, an association is made of entity to entity in block 414, binding of entities is performed in block 416, named entity recognition (NER) classification is performed in block 418, entity protocol determination and classification is performed in block 420, and an active rule engine is used for classification in block 422. The output of the active rules engine is input to the ensemble layer for detection 430. As an illustrative example of aspects of the semantic business rules engine for classification, consider the problem of recognizing a particular credit card number as PII. In one implementation, a named entity recognizer generates "NUM" as a tag. A rule that can be applied for credit cards is that if the numbers occur sequentially (i.e., Num-Num-Num and so on) and add up to 16 digits, the PII is a "Credit Card Number." This illustrates the need for additional rules on top of a named entity recognizer. As a further complexity, some credit cards have a total number of digits different than 16. There are a variety of rules for the format of different credit cards used around the world. As other examples of rules, some types of government ID numbers have a specific format. For example, a social security number is a nine-digit number. However, to detect some types of sensitive information require a contextual understanding of different combinations of words and/or numbers such as to identify personal address information and personal email addresses, health information, etc.

The combination of a semantic rule engine for initial classification and the context-based classification performs of the ensemble layer for detection supports effective detection of sensitive data in structured data, unstructured data, and semi-structured data. This detection approach also supports detecting a wide variety of different types of sensitive data.

An AI/ML model for classification is identified in block 432 based on the output of active rule engine 422. Pretrained AI/ML transformer models are selected in block 434. The selected pretrained transformer model is used by a context builder module 436 to build the context for performing context-based classification 438. The output 440 may include information for each data source (e.g., data source 1, data source 2, etc.) on an initial detection of different types of sensitive data (e.g., PII, PHI, NPI, SPI, PAI, etc.). In some implementations, a residual entity feedback layer 142 is included to provide a feedback input, based on the output 440, to the ensemble layer for detection 430.

Various components of the CCE 101 include AI/ML models. As one example, the ensemble layer for detection 430 includes AI/ML models that need to be trained/retrained.

Figure 5:
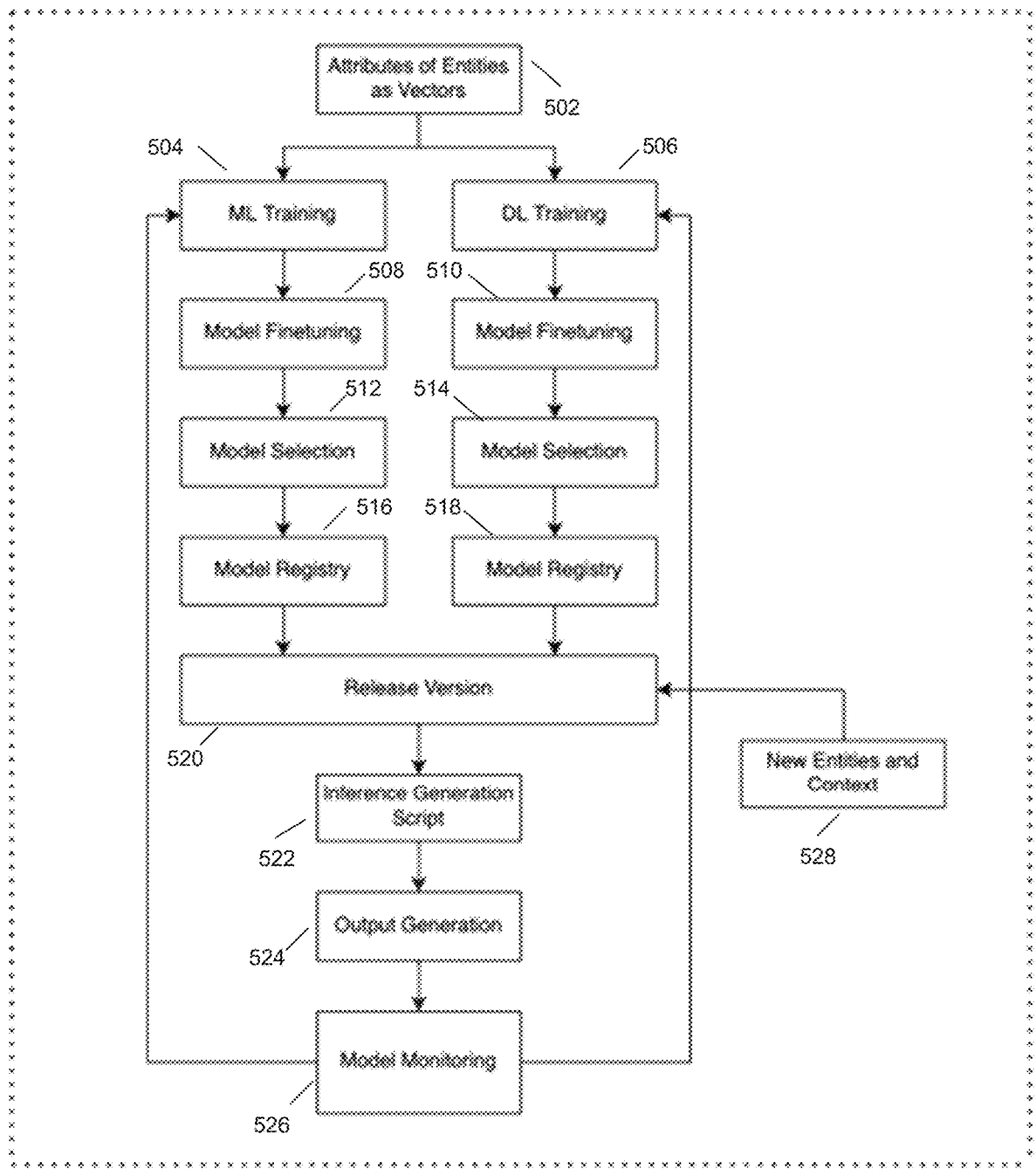
FIG. 5 is a flow chart of an example of machine learning and deep learning in accordance with an implementation.

FIG. 5 illustrates how machine learning and deep learning components are used in a ML/DL module to train, fine tune, and select and register machine learning and deep learning models. In block 502 attributes of entities as vectors is provided. ML training and DL training are provided in blocks 504 and 506. Model finetuning is provided in blocks 508 and 510. Model selection is provided in blocks 512 and 514. Model registry is provided in blocks 516 and 518. A released version 520 receives new entities and context from block 528, generates an inference generation script 522, and generates an output in block 524. The model is monitored in block 526 and the results used for subsequent training. As examples, there may be an initial training phase and periodic updates to the machine learning and deep learning models.

Figure 6:
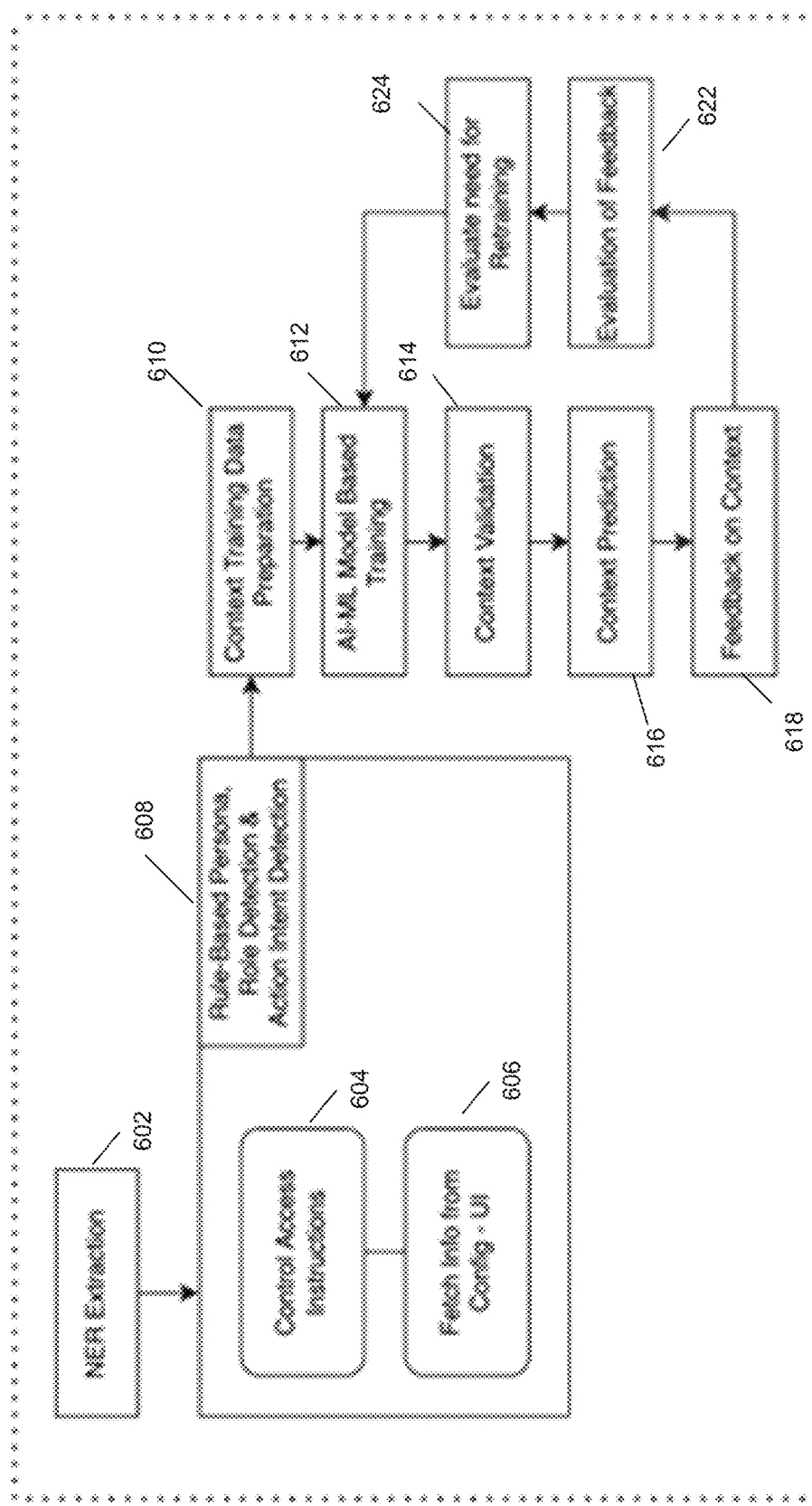
FIG. 6 illustrates aspects of a context builder module in accordance with an implementation.

FIG. 6 illustrates a context builder module to train an AI/ML model used for context prediction. Some of the inputs for context prediction are generated based on the named entity recognition (NER) extraction 602. Control access instructions 604 may be used to fetch information from the configuration UI in module 606. That is, the context building process depends on the control access instructions and information from the configuration UI. Building context is important to improve the detection process. As an example, suppose someone is complaining about a fraudulent "Credit Card Transaction." In this example, it is easier to confirm the Credit Card Number without any addition layer of confirmation because "complaint", "fraudulent", and "Credit Card Transaction" provide the necessary context. That, as illustrated by this example, certain combination of words and phrases provide context for detecting a 16-digit number is a credit card number without requiring additional layers of confirmation.

Module 608 supports rule-based persona, role detection and action intent detection. The resulting sources of information are provided to context training data preparation module 610. An AI/ML model-based training module 612 has its output checked by context validation module 614, context prediction module 616, and context feedback module 618. Evaluation of feedback is performed in module 622 and an evaluation is made in module 624 whether retraining is needed.

Figure 7:
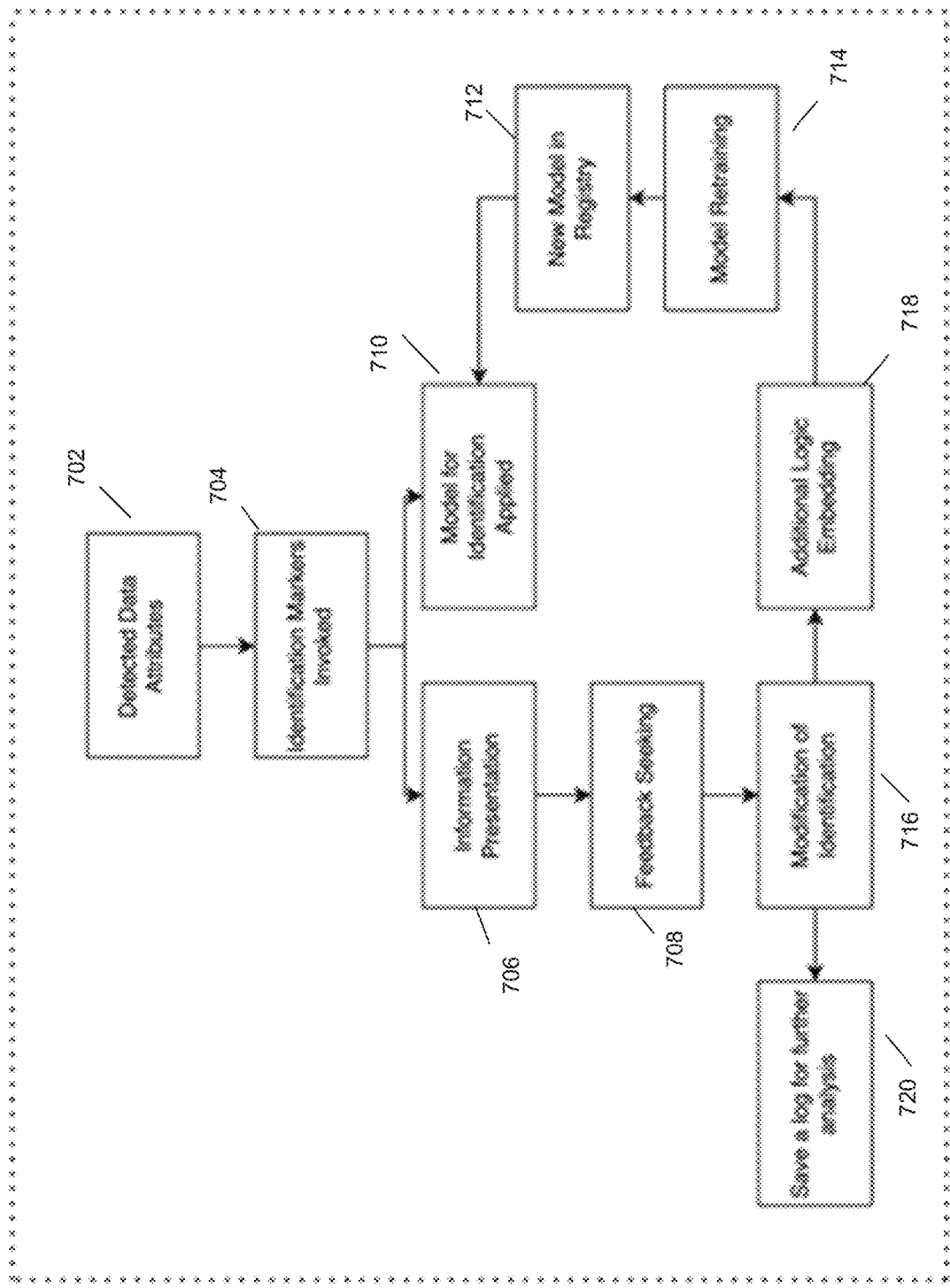
FIG. 7 illustrates a flow of operations in an identification module in accordance with an implementation.

In one implementation, the identification module takes a multi-pathed approach in recognizing each data point of sensitive information and distinctly differentiating it from other sensitive data points. Referring to FIG. 7, a method for generating and using a machine learning/AI model for identification is illustrated. Detected data attributes 702 are used to invoke identification markers in block 704. In one implementation, the purpose of invoking the identification marker is to assign a tag to sensitive data, where the tag may identify the types or attributes of sensitive data. For example, for PII, the purpose of the identification marker is to assign a tag to the PII. For example, there may be tags for social security numbers, driver's license (DL) numbers, etc. (e.g., DL no. 23712831273 as a DL tag). It will be understood that a variety of different types of tags may be supported. The path then branches. In the right branch, block 710 illustrates the application of the trained model for identification. In the left branch, the path goes through information presentation in block 706 and feedback seeking blocks 708 to the modification of identification in block 716. Additional logic embedding is performed in block 718. Model retraining is performed in block 714. A new model in registry 712 is created for a newly trained model. Other blocks, such as block 720, may save logs for further analysis. In one implementation, a domain expert reviews misidentified entities. Reasons are attributed to corresponding processes and necessary improvements undertaken as a feedback loop. This feedback loop aids the identification marking process.

Figure 8:
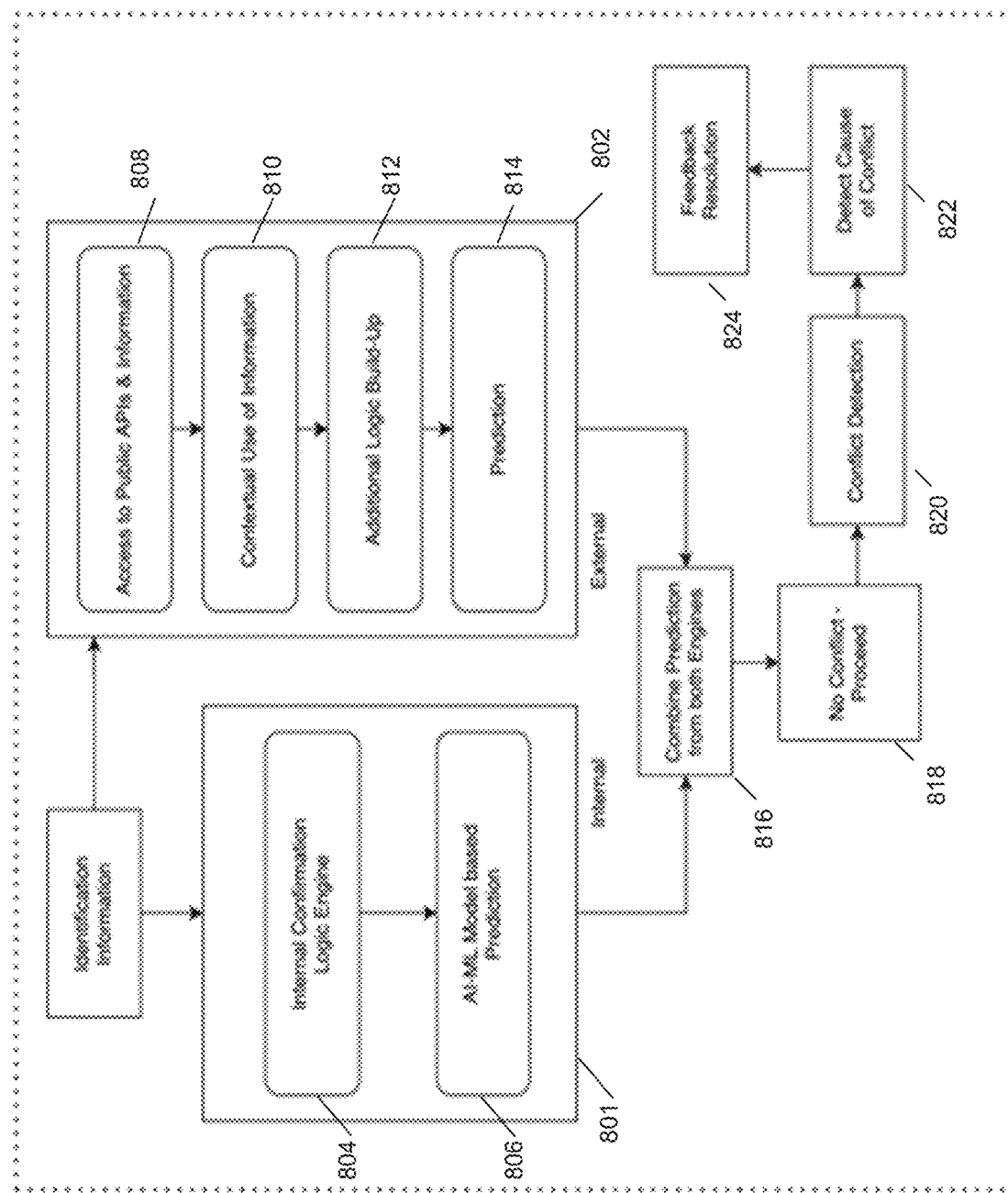
FIG. 8 illustrates the operation of a confirm module in accordance with an implementation.

FIG. 8 illustrates an example of a confirmation module. The identification information is checked using an internal check engine 801 and an external check engine 802. The internal check may include, for example, checks performed by an internal confirmation logic engine 804 and AI/ML model-based prediction 806. The external check may include, for example, access to public APIs and information 808, contextual use of information 810, additional logic build-up 812, and prediction 814. These are non-exclusive examples of ways of generating different types of predictions about whether to trust the identification information. In block 816 the predictions are combined from both engines. In block 818, if there is no conflict, the identification process proceeds to a confirmation. If not, conflict resolution is performed in block 820. If a conflict is detected, the cause of the conflict is detected in block 822 and feedback resolution is initiated in block 824. In regard to the confirmation module of FIG. 8, the way of combining both internal checks and external checks provides improved accuracy in confirming identification information.

Figure 9:
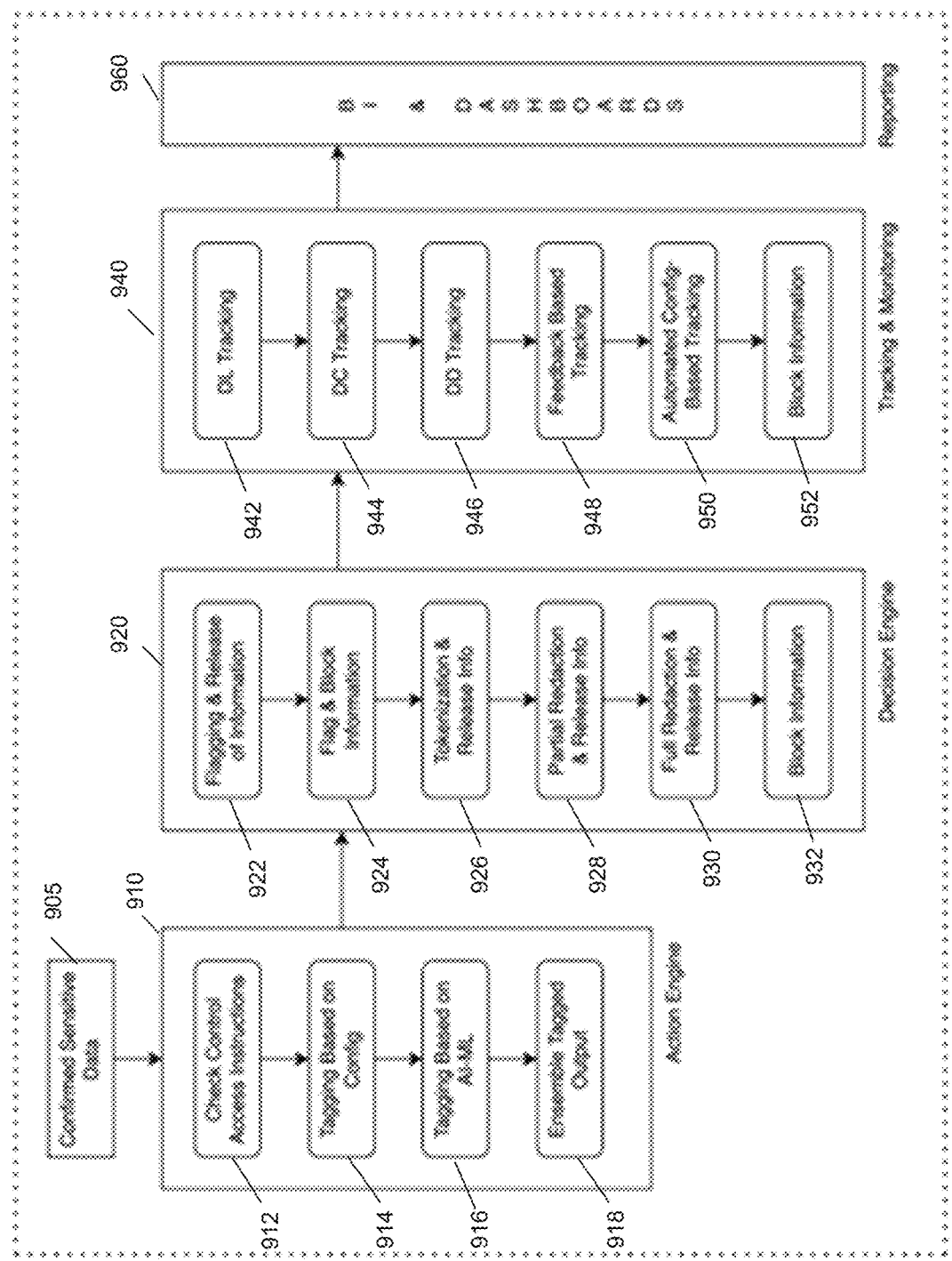
FIG. 9 illustrates the operation of a tagging and classification module in accordance with an implementation.

FIG. 9 illustrates a tagging module to tag confirmed sensitive data 905. The tagging module includes an action engine, 910, a decision engine 920, a tracking and monitoring engine 940, and a reporting module 960 which may, for example, support business intelligence on one or more dashboards. The action engine 910 may include a step to check control access instruction 912. One or more different ways of tagging may be performed. In step 914, tagging based on configuration is performed. In step 916, tagging is based on an AI/ML model. In step 918, an ensemble of tagged outputs is generated based on the different types of tagging performed.

The decision engine 920 may perform one or more decisions. Depending on implementation details, this may include flagging and blocking information, flagging and releasing information, tokenization and releasing information, partial or full redaction and release of information, or blocking of information. In block 922, there is flagging and release of information. In block 924, there is flagging and blocking of information. In block 926, there is tokenization and release of information. In block 928, there is partial redaction and release of information. In block 930, there is full redaction and release of information. In block 932, there is blocking of information.

In the tracking and monitoring module 940, different types of tracking may be supported, such as Driver's License (DL) tracking 942, Data Consistency (DC) tracking 944, Data Depth (DD) tracking 946, feedback-based tracking 948, and automated configuration-based tracking 950 and blocking of information in block 952 information from tracking in block 952.

Figure 10:
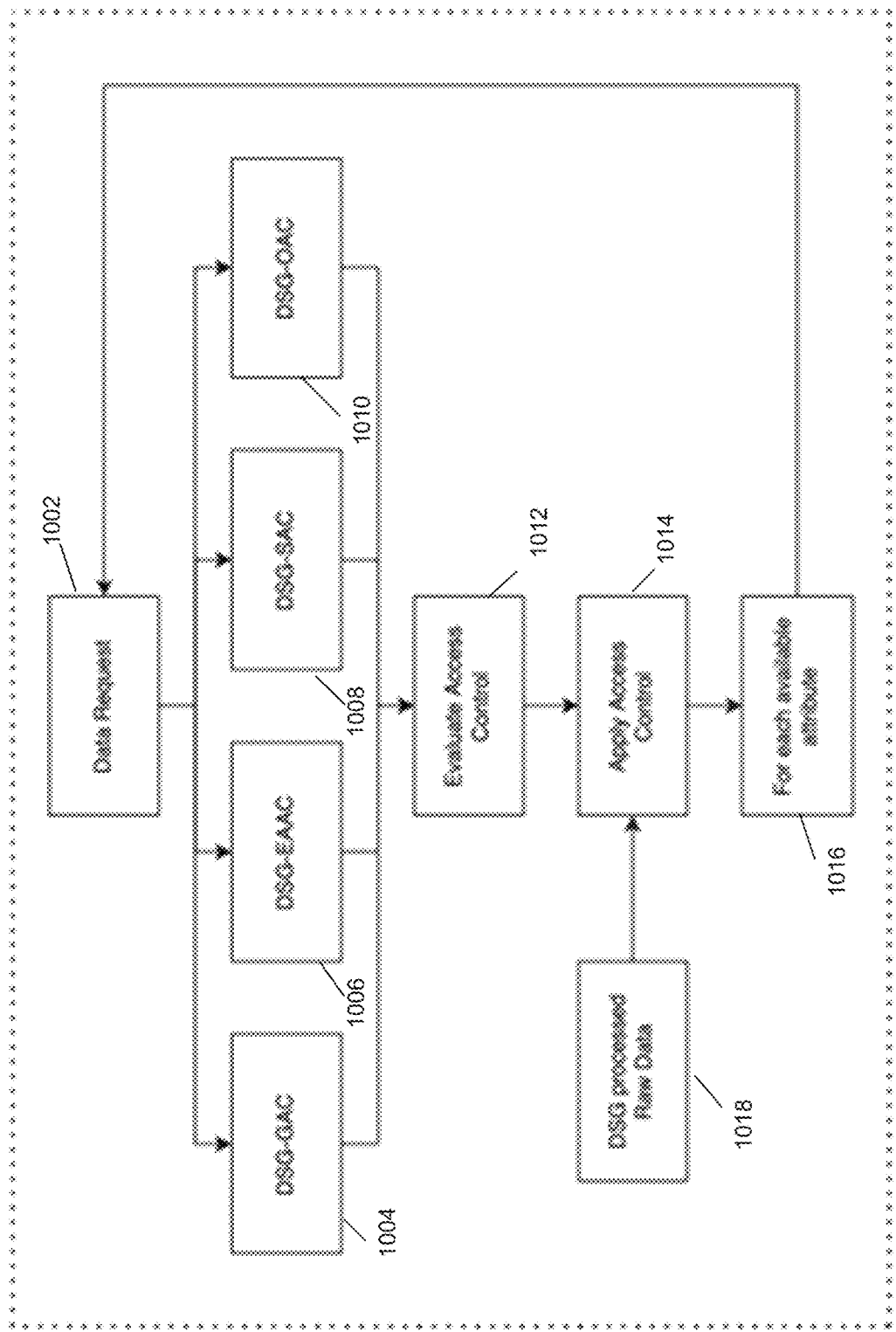
FIG. 10 illustrates an example of the use of control access instructions in accordance with an implementation.

FIG. 10 illustrates an example of the use of control access instructions. Control access instructions include operational methods that vector encapsulates a broad array of functions applied to the RDF for a desired output. It contains functions for transforming a Meta config file to a Metafile matrix which is used by the workflow configuration, data owner preferences (account matrix), Examples of control access instructions developed by the Applicant, Data Safeguard, Inc. (DSG), include proprietary versions of control access control instructions for global access control, enterprise access control, system access control, and open authentication access control. In FIG. 10, these are illustrated as: 1) DSG-GAC: Data Safeguard Global Access Control; 2) DSG-EAAC: Data Safeguard Enterprise Access Control; 3) DSG-SAC: Data Safeguard System Access Control; and 4) DSG-OAC: Data Safeguard OAuth (Open Authentication) Access Control. One of ordinary skill in the art would understand that other examples of control access instructions could be used to implement the same overall functionality. The application of the methods matrices, the order, iterations, priorities, weightages for optimal performance are determined by the CCE's control algorithm.

In block 1002, there is a data request. The appropriate configuration files are accessed, such as for DSG-GAC 1004, DSG-EAAC 905, DSG-SAC 1008, and DSG-OAC 1010. The output is provided to an evaluate access control block 1012 that also receives DSG processed raw data from block 1018. In block 1014, the apply access control block implements the access control instructions. As illustrated in block 1016, for each available attribute, the process loops back to data request block 1002.

Figure 11:
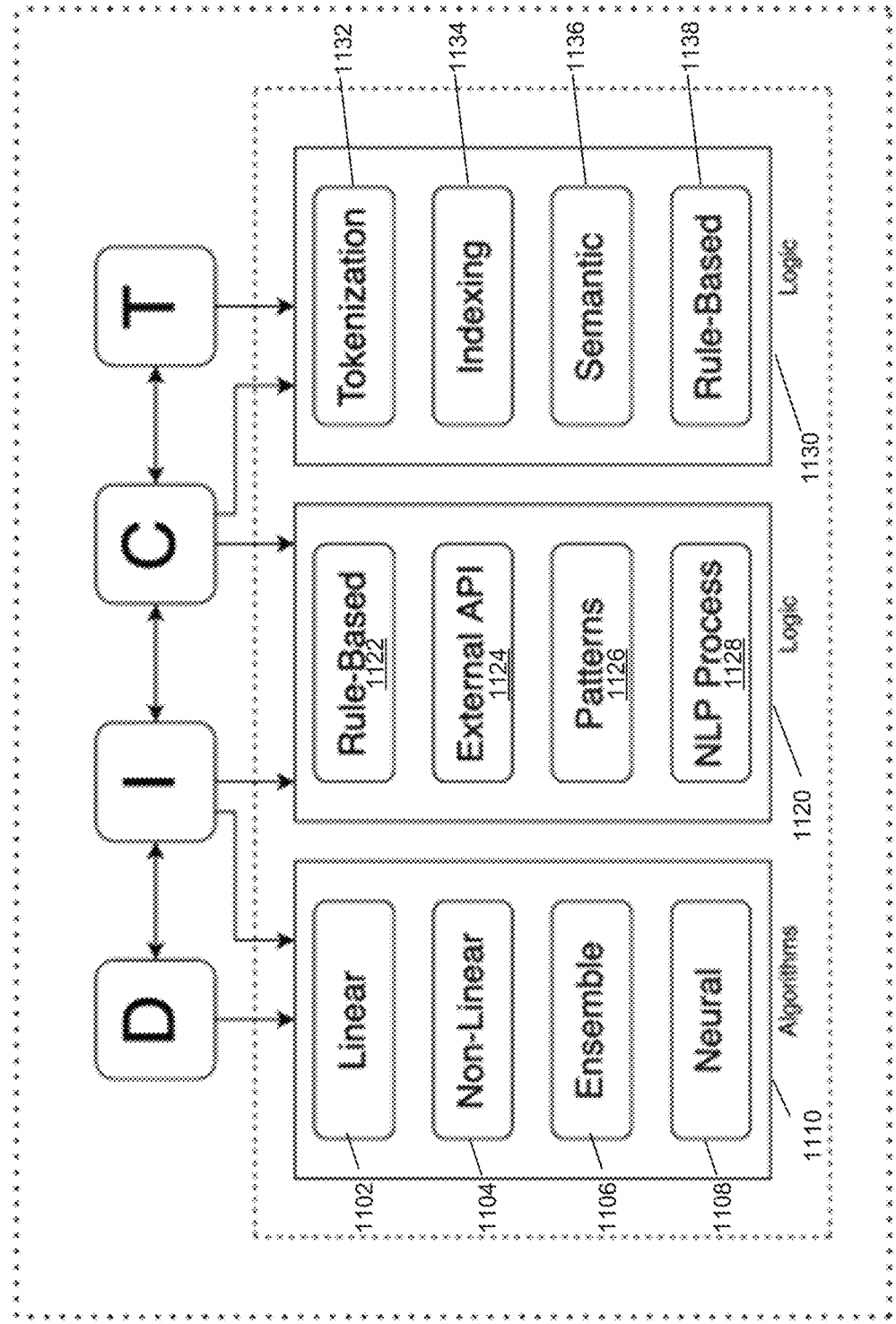
FIG. 11 illustrates the uses of different types of algorithms and logical operation in a multi-layered and multi-path architecture in accordance with an implementation.

FIG. 11 illustrates at a high level that the DICT architecture is multi-layered and multi-pathed. FIG. 11 illustrates how the overall DICT architecture includes algorithm components 1110 and logic blocks 1120 and 1130. At a high level, the algorithms include linear algorithms 1102, non-linear algorithms 1104, ensemble algorithms 1106 and neural network (ML/AI) algorithms 1108. A first logic block includes rule-based logic 1122, external API logic 1124, patterns logic 1126, and NLP process logic 1128. A second logic block 1120 includes tokenization logic 1132, indexing logic 1134, semantic logic 1135, and rule-based logic 1138. The arrows indicate different possible interactions in the multi-layered and multi-pathed design.

Figure 12:
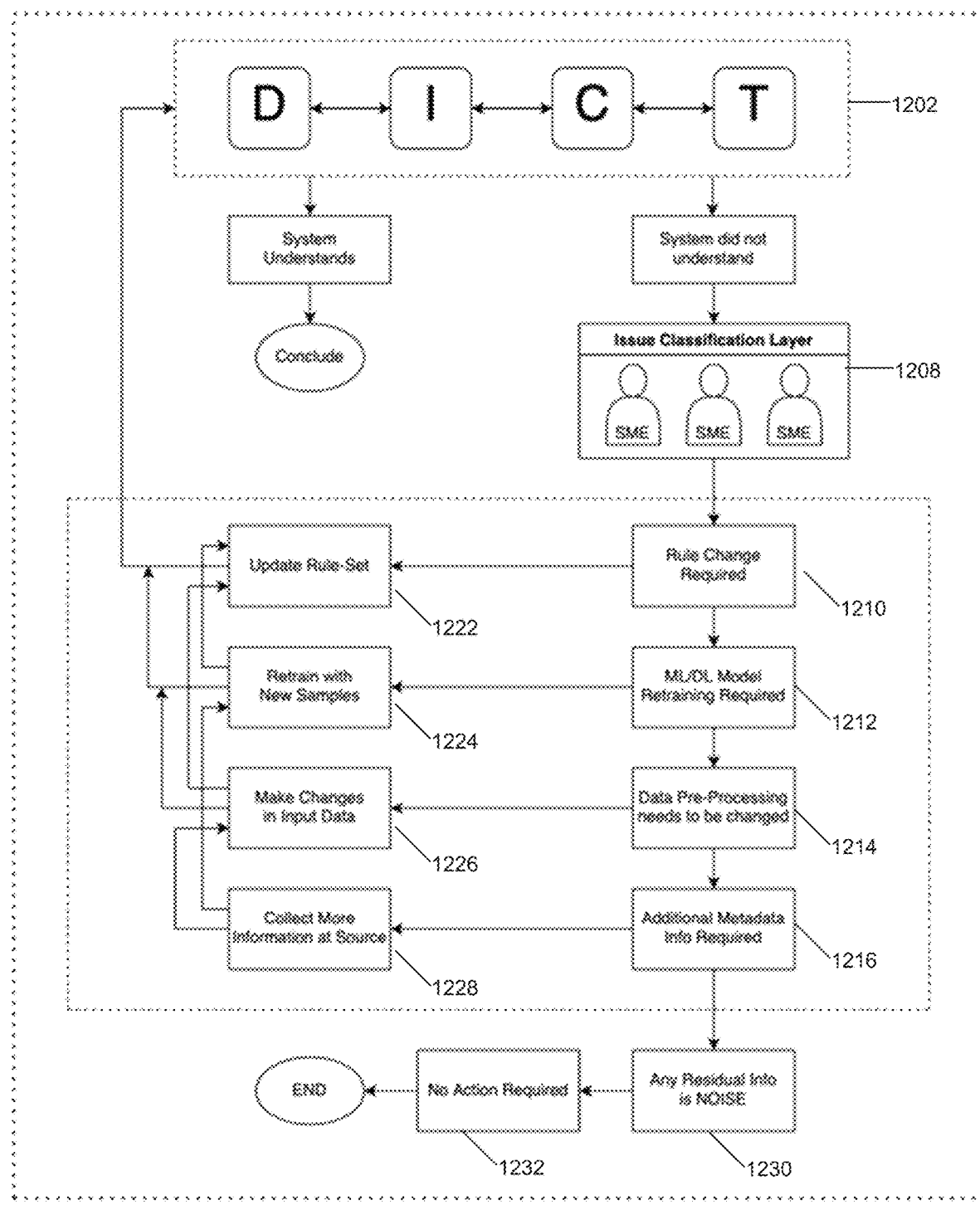
FIG. 12 illustrates aspects of a feedback layer in accordance with an implementation.

FIG. 12 illustrates an example of a feedback layer that may be used to trigger updates, retrain, change input data, collect more information, etc. Performance criteria may be defined for the core DICT module 1202 of the CCE 101. If a performance issue arises (e.g., an accuracy metric is not met or other criteria is not met regarding the CCE 101 not understanding the presence of sensitive data), the issue may be classified in an issue classification layer 1208 (e.g., by subject matter experts) and used to determine if a rule change is required in block 1210 to update the rule-set in block 1222; determine in block 1212 if retraining of the ML/DL model is required by retraining with new samples 1224; determine in block 1214 if data preprocessing needs to be changed to make changes to input data in block 1226; and determine if additional metadata information is required in block 1216 and collect more information at source in block 1228. One aspect of the feedback layer of FIG. 12 is that it may be used to achieve a high accuracy of identifying sensitive data. The feedback process may be implemented until it can be determined that within some desired margin of noise error 1230 exists such that no further action is required in block 1232.

Some of the benefits of the CCE is that it may be used to provide a comprehensive solution for PII and other forms of sensitive information having a variety of different data formats (e.g., structured, semi-structured, and unstructured) from a wide variety of different source types. It supports an intelligent way of tagging by confirming the presence of each instance of identified and detected sensitive information. It supports detection and identification from unstructured data and at scale. The multi-pathed approach supports identifying sensitive data in different formats, including unstructured data. It supports identifying sensitive data at volume with a spread of information across formats, which requires a multi-pathed approach. The CCE 101 may use pre-trained large scale natural language processing and machine learning models provide the ability to recognize the elements of sentences. It also supports compliance with a variety of different data privacy, confidentiality, and security protocols. It will be understood that the combination of features of different modules support near real-time operation, at scale, and with high accuracy. The overall CCE 101 may be implemented with a combination of features that provides a multi-path and multi-layer solution.

Figure 13:
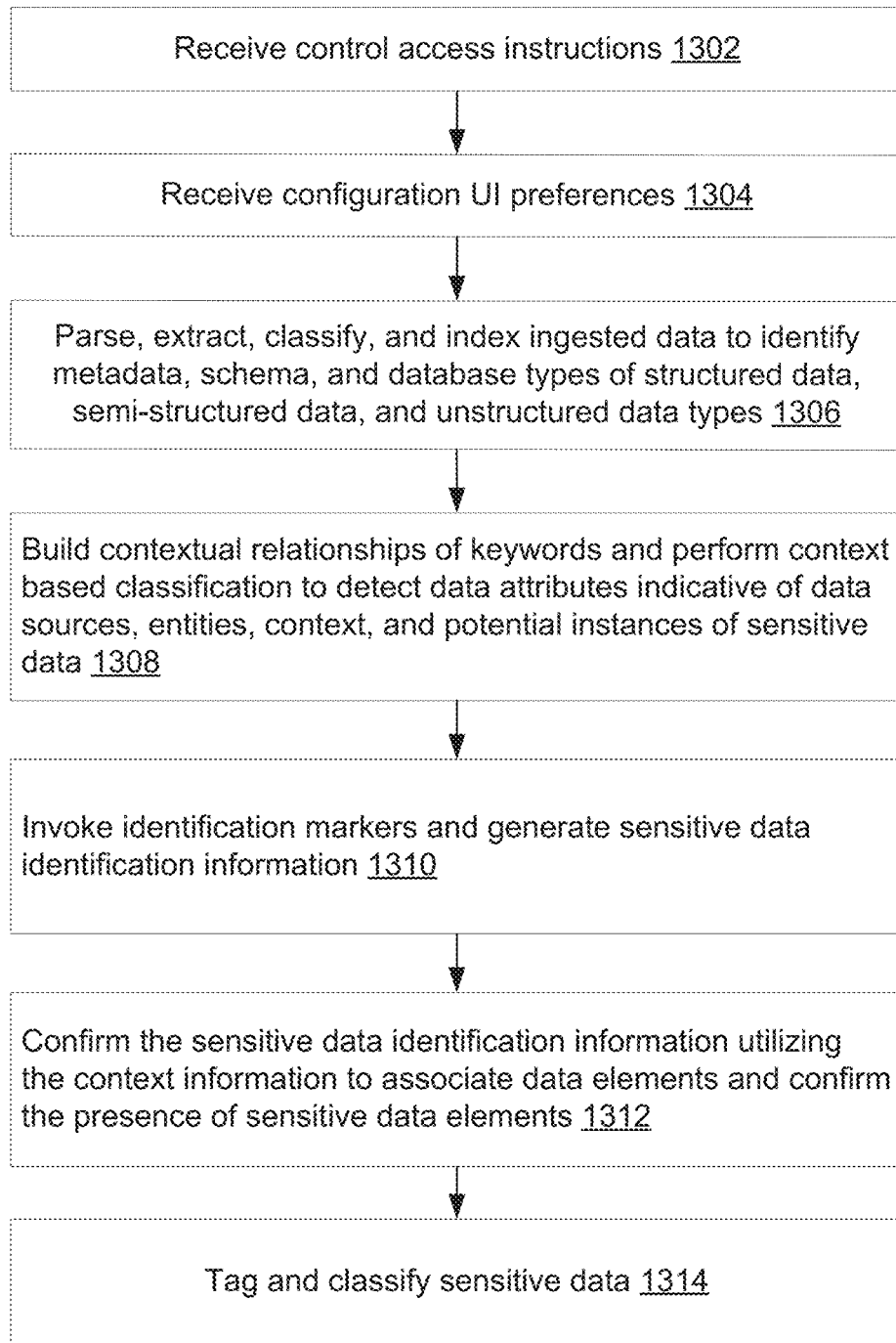
FIG. 13 is a flowchart of a high-level method in accordance with an implementation.

Referring to the flow chart of FIG. 13, an example high-level method includes receiving control access instruction 1302 and receiving configuration UI preferences 1304. In block 1306, the method parses, extracts, classifies, and indexes ingested data to identify metadata, schema, and database types of structured data, semi-structured data, and unstructured data. In block 1308, contextual analysis of keywords to perform context-based classification to detect data attributes of data sources, entities, context, and potential instances of sensitive data. In block 1310, identification markers are invoked, and sensitive data is identified. In block 1312, the sensitive data is confirmed in a confirmation sub-process. In block 1314, sensitive data is tagged and classified.

ID Mask

In one implementation, the CCE 101 is used to support a data masking solution that leverages off of the automatic identification of PII and other sensitive data by the CCE 101. As illustrated in FIG. 1, data redaction engine 160 may be provided, as either a separate component or as part of the CCE 101. A commercial implementation of the masking solution by the Applicant of the present disclosure has the trademarked name ID-MASK®

Figure 14:
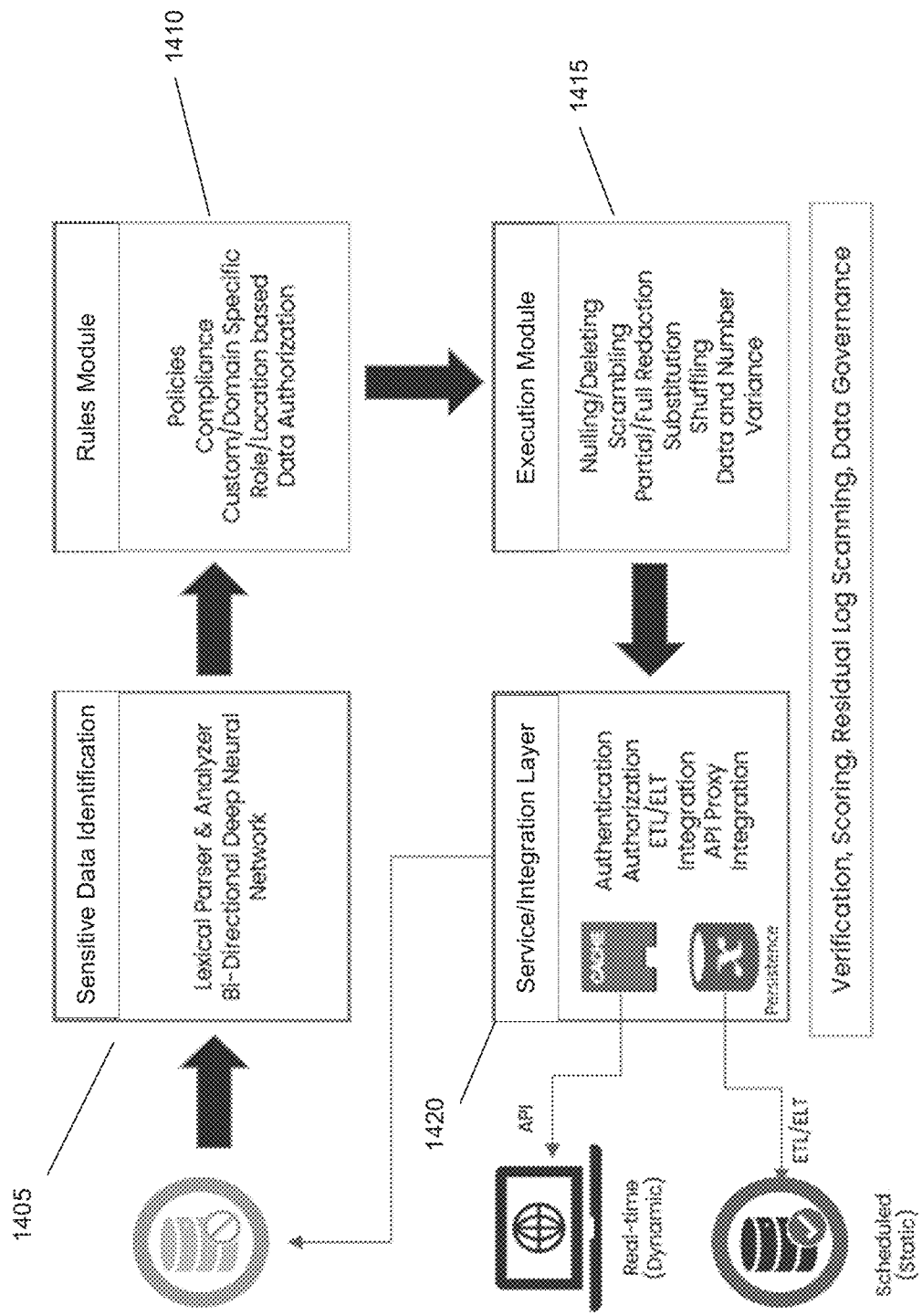
FIG. 14 is a high-level diagram illustrating interaction of components to implement masking in accordance with an implementation.

FIG. 14 illustrates exemplary functional blocks for implementing masking. Sensitive data identification 1405 may be performed by some or all of the components of the CCE 101. In one implementation a rules engine module 1410, execution module 1415, and service/integration layer 1420 is provided. The rules engine module 1410 may include policies, compliance, custom/domain specific rule, and location-based data authorization. The execution module 1415 may support masking techniques such as nulling/deleting, scrambling, partial/full redaction, substitution, shuffling, and data and number variance. The service/integration layer 1420 may support cache storage for real time applications and persistent storage using Extract, Transform, and Load (ETL) or Extract, Load, and Transform (ELT). Example layer functions include authentication, authorization, ETL/ELT, integration, and well-known processes such as APT Proxy.

Figure 15:
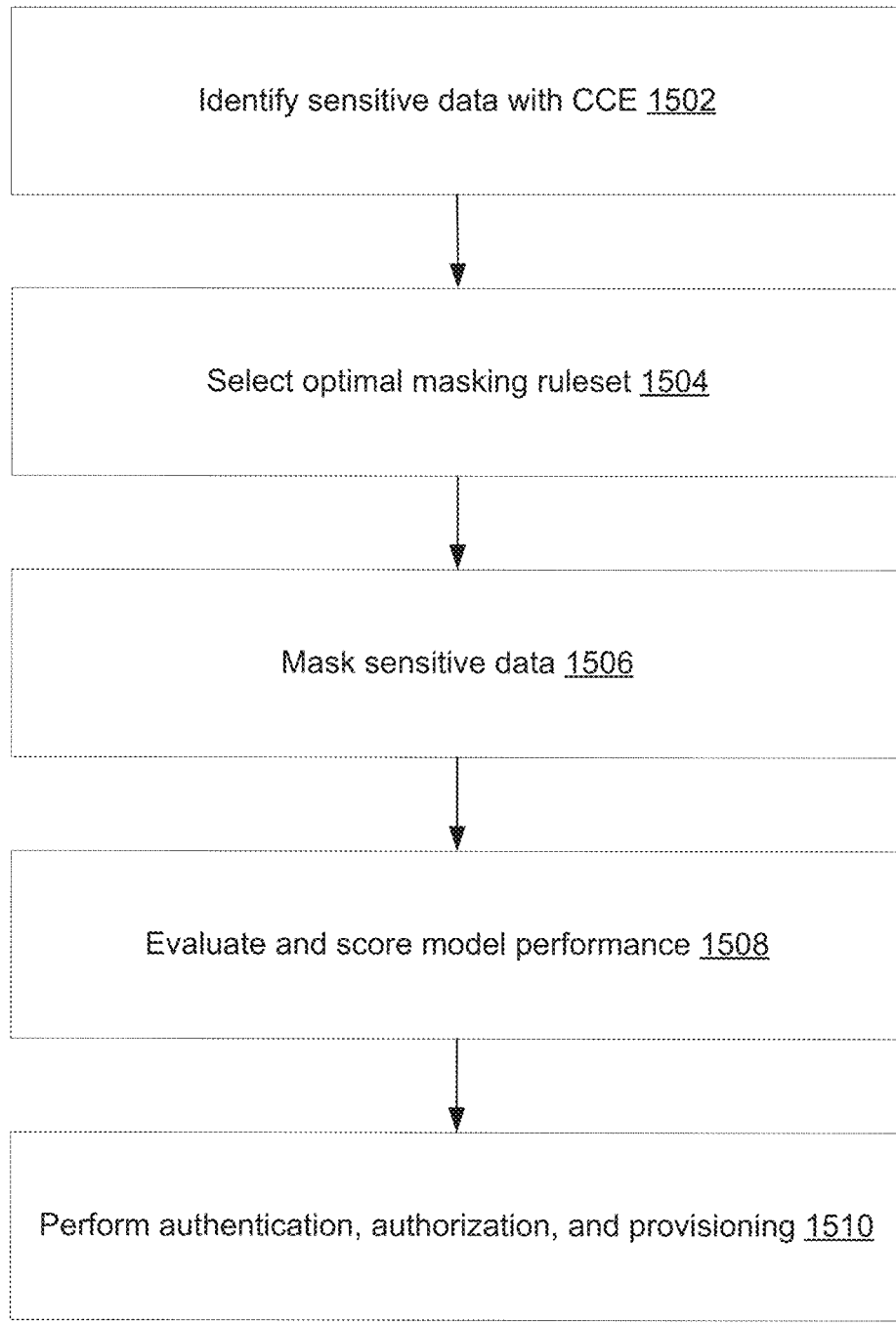
FIG. 15 is a flowchart of a method of masking in accordance with an implementation.

As illustrated in FIG. 15, an exemplary method of redaction begins with using the CCE to identify sensitive data in block 1502. In block 1504, an optimal masking ruleset is selected. In some implementations, a UI portal supports a configurable ruleset. A rules module may be used to identify the relevant factors such as policies, compliance, custom/domain specific, role/location based, and data authorization. In block 1506, sensitive data is masked. Exemplary masking techniques include nulling/deleting, scrambling, substitution, shuffling, and data and number variance. Role and location-based masking may be performed. The masking may use a non-deterministic algorithm, making unmasking effectively impossible. In block 1508, evaluation and scoring of model performance is performed. In block 1510, authentication, authorization, and provisioning are performed.

ID REDACT

As previously discussed, redaction of sensitive data may be implemented as an option in the previously discussed implementations. Alternatively referring to FIG. 1, a redaction engine 160 may be provided to implement redaction of sensitive data. Regardless of implemented details, redaction may be performed of sensitive and personal data found in unstructured, semi-structured, and structured data ecosystem. Redaction serves as a first line of defense in the PII and compliance worlds. The redaction may be performed to ensure GDPR, NIST, CCPA, PCI, HIPPA compliance with a compliance engine 180. A commercial implementation of the redaction solution by the Applicant of the present disclosure has the trademarked name ID-REDACT®

Data Lineage

Figure 16A:
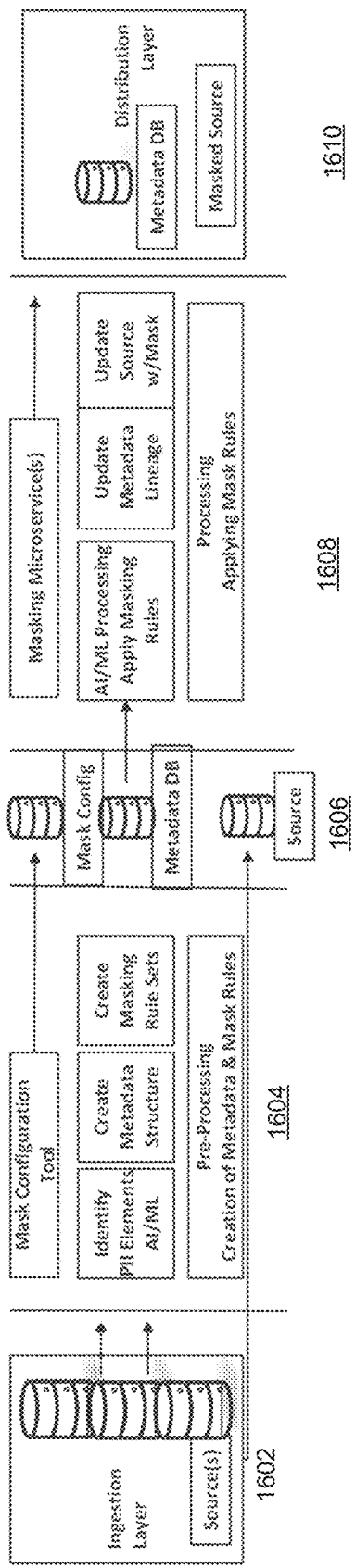
FIG. 16A illustrates aspects of tracking data lineage in accordance with an implementation.
Figure 16B:
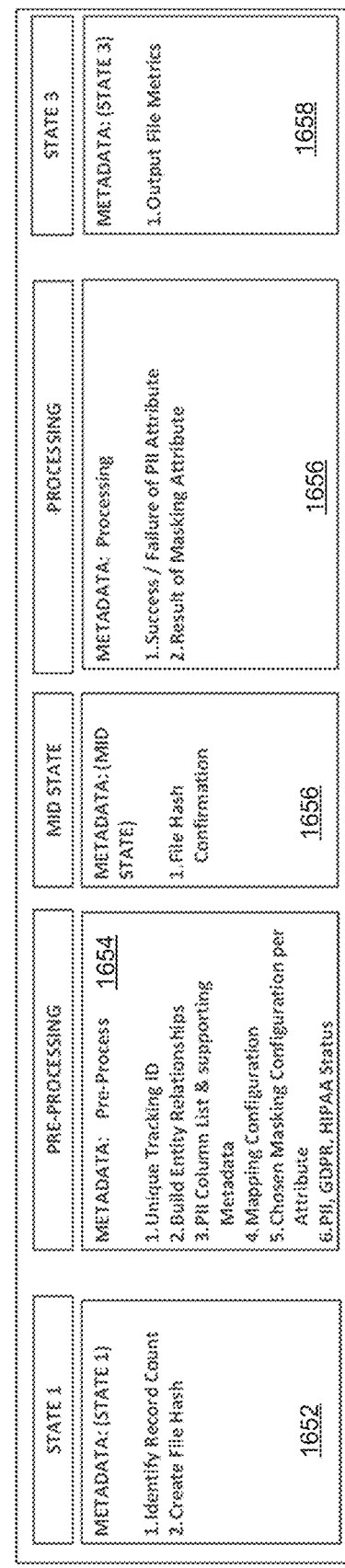
FIG. 16B illustrates aspects of tracking data lineage in accordance with an implementation.

FIG. 16A and FIG. 16B illustrate a data lineage process. As illustrated in FIG. 16A and FIG. 16B, metadata lineage data is created and updated. An initial metadata state is generated for ingested data. FIG. 16A corresponds to a sequence of processing steps and FIG. 16B describes corresponding metadata states.

FIG. 16A illustrates a sequence of operations from processing to distributing data. Ingest of data occurs in step 1602. Preprocessing in step 1604 includes identifying sensitive data elements (e.g., PII), creating a metadata structure and creating masking rules. At step 1606, a mask configuration exists, along with metadata, and source data. In step 1608, masking rules are applied, the metadata lineage is updated, and the source data is updated with the mask. In step 1610, a distribution layer is supported to distribute the masked source data.

FIG. 16B illustrates progression of metadata through a sequence of states. Referring to FIG. 16B, this may include, for example, identifying a record count and creating a hash file in block 1652, corresponding to State 1. Pre-processing in block 1654 may include identifying PII/sensitive elements, creating a metadata structure, and creating rule sets (e.g., for masking). A mid-state in block 1656 may include file hash confirmation. A metadata process is applied in block 1656. In State 3, the file metrics may be output.

Compliance Engine

Many enterprise companies spend considerable resources ensuring compliance with data privacy laws and regulations. For example, some data privacy officers spend many hours each week just trying to keep up with changes in data privacy laws and regulations. Referring again to FIG. 1, the compliance engine 180 may be implemented to aid enterprises to ensure compliance with the relevant compliance requirements and adapt to changes in privacy regulations and laws.

In one implementation the compliance engine may include rules, algorithms, and user interfaces to aid in complying with data privacy laws and regulations. Machine learning/AI models may also be programmed to aid the compliance engine to aid in performing its functions.

In one implementation, the compliance engine 180 supports privacy compliance. with all the major data privacy laws, like CPRA, GDPR, PIPEDA, LGPD, PIPL, but may more generally be adapted to support compliance with any existing or future data privacy regulations. The compliance engine 180 may, for example, be designed to oversee customer data privacy preferences and consent management. The compliance engine may also be designed to support a DSAR (data subject access request).

The compliance engine may, for example, be designed to aid a Chief Privacy Officer to ensure compliance with data privacy laws. For example, the compliance engine may be programmed (and updated) under the guidance of subject matter experts in data privacy law. The compliance engine may also be regularly updated to reflect changes in privacy laws and privacy regulations. In some implementations, The CCE and the compliance engine are regularly updated to reflect best practices in the data privacy compliance, thus simplifying and reducing the work of privacy officers of enterprises using the CCE and the compliance engine.

The CCE and compliance engine may, for example, implement algorithms and support user interfaces for consent management in different regions of the world. The CCE and compliance engine may be configured to understand the DSAR process in different regions (if the local law has one), and take into account, adjustments that need to be made to serve customers in that region, data governance practices that need to be adopted, and how to manage a host of additional compliance needs. The CCE and compliance engine may, for example receive regular updates on data privacy laws and regulations in different regions of the world.

In one implementation the CCE and compliance engine maintains a Record of Processing Activity (or RoPA), which is essential for any business aiming to become compliant by the GDPR. A RoPA is a snapshot of all the data processing activities that take place at your organization. That includes describing where data lives, what kind of data is being processed, who manages the data, what it is being used for, how long it can be kept, and so on. A RoPA is only required by the GDPR. However, it informs all the compliance requirements that other data privacy laws have. With a RoPA in place, the CCE and compliance engine are positioned to respond to DSARs, self-audit, update the policy documents, and be confident that we are following the law to the best of our ability.

In one implementation, the types of information captured in the RoPa may be adjusted as the data processing activities of the CCE change. For example, as the data processing activities change, the CCE and compliance engine update the RoPa on a regular basis. In one implementation, the compliance engine generates compliance audits in which it compares current data privacy requirement (e.g., after updates to privacy developments such as legislative update and be analyzing internal data (such as data processing activities captured in our RoPA). A compliance audit may be performed, for example, to generate an alert when there has been a change that requires a revision to a privacy policy.

In one implementation, the compliance engine is configured to generate information to respond to DSARs. For GDPR, CPRA, and similar laws requiring DSARs, the compliance engine may be programmed to ensure data subjects are informed about and able to exercise their rights.

While it is perfectly compliant to manage DSARs through emails and spreadsheets, in one implementation the compliance engine oversees DSARs. A secure messaging portal may be provided by the compliance engine for data subjects to make their request, which has the added benefit of requiring identity verification and limits requests to those counted in the relevant data privacy law. This cuts down on spam and vexatious requests.

In one implementation, the compliance engine ensures that the compliance workflow is consistent and automated. Having recorded where the data lives and how it flows throughout the organization in the RoPA, it is straightforward to add that information into Subject Rights Management and Data Discovery tools.

Because of this, the compliance engine knows exactly which data stores to look in when a data subject requests access to their data. The compliance engine automatically informs the relevant data store administrator what actions they need to take and what fields they need to update to complete the request.

ID Fraud Engine

A larger suite of services may optionally include an ID fraud solution. ID fraud includes a wide variety of identity fraud. This includes fraudsters using fake PII to apply for credit cards, apply for loans, apply for government benefits, etc. Another aspect of ID fraud is that fraudsters may attempt to create a synthetic identity.

Synthetic fraud includes a fraudster generating a synthetic identity that is a combination of real and fake data to fabricate credentials where the implied identity is not associated with a real person. As one example, fraudsters may create synthetic identities using potentially valid social security numbers (SSNs) combined with accompanying false personally identifiable information (PII). This is sometimes referred to as a Frankenstein identity because it is formed from a combination of different pieces of data from different sources, in analogy to the way the fictional character of Frankenstein was created from pieces of different human bodies.

Fraud detection, including synthetic fraud detection, starts with an analysis of what aspects of data correspond to what would ordinarily be personally identical information and other types of information combined with it to commit fraud.

Attempted identity fraud, including attempted synthetic fraud may have associated with a larger pattern of anomalous behavior by a bad actor. For example, fraudsters may have unusual patterns of behavior in terms of their geolocation, the time of day they submit application requests, their network address, etc. There may be unusual patterns of data in their overall credit history and payment history as another example. A wide variety of information may be considered in combination to identify potential fraud by an actor using a synthetic identity.

Identity fraud detection, including synthetic fraud detection, may include analyzing PII information in, for example, initial analysis of application data for credit cards, loans, and other applications. In some implementations, the synthetic fraud detection leverages off of the capability of the CCE to identify PII in application data.

For synthetic fraud detection, machine learning/AI techniques may be used to generate training data for good actors and bad actors and generate machine learning/AI models to weight different sources of data and classify applications into those by good actors or bad actors.

Figure 17A:
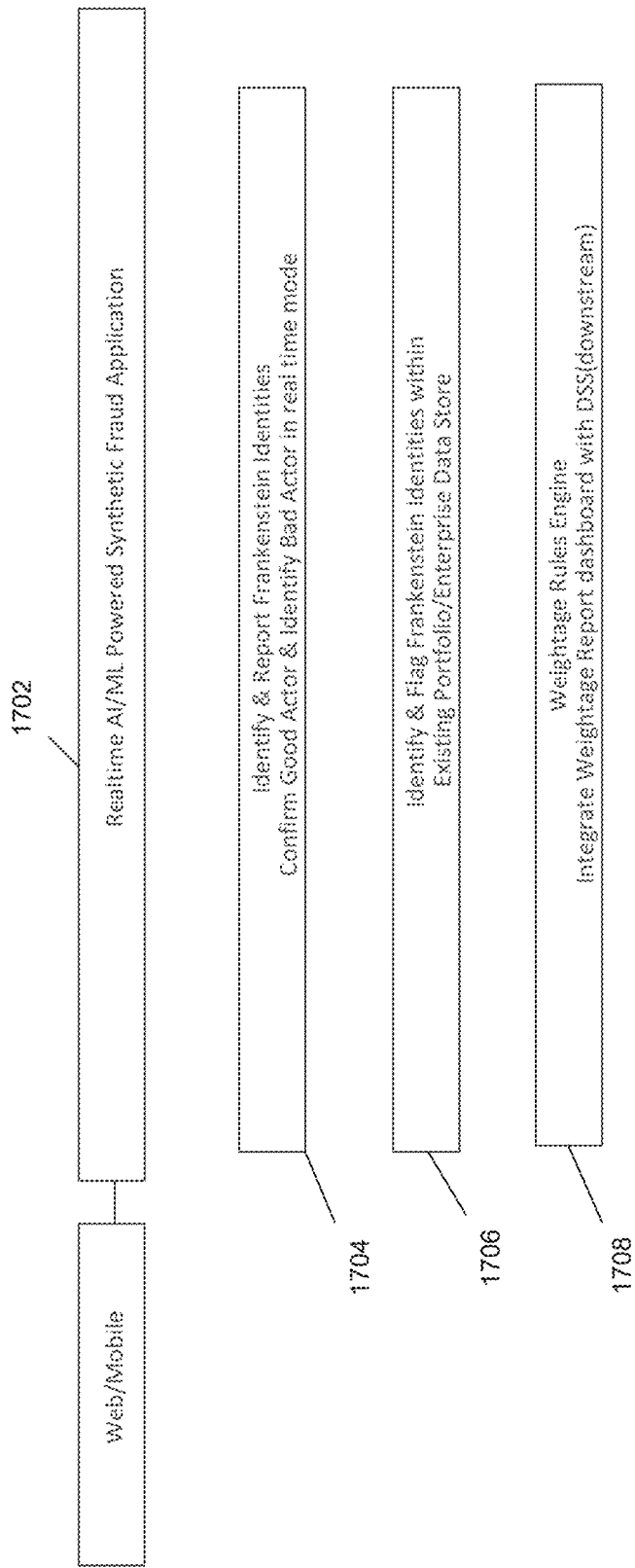
FIG. 17A illustrates aspects of an example of a synthetic fraud application in accordance with an implementation.

As illustrated in FIG. 17A, a real time AI/ML synthetic fraud application may include a module 1704 to identify and report Frankenstein identities. In block 1706, Frankenstein identities are identified and tagged with an existing portfolio or data store. In block 1708, a weightage rules engine to aid in making fraud detection decisions is used to distinguish good actors and bad actors. For example, a weighted score or a confidence score can be generated. Thresholds may be defined for the weighted score/confidence score to distinguish good actors and bad actors. More generally a machine learning technique may be used to train a classifier to classify good actors and bad actors based on available information. In one implementation, the weightage rules engine is integrated with a weightage report dashboard.

Figure 17B:
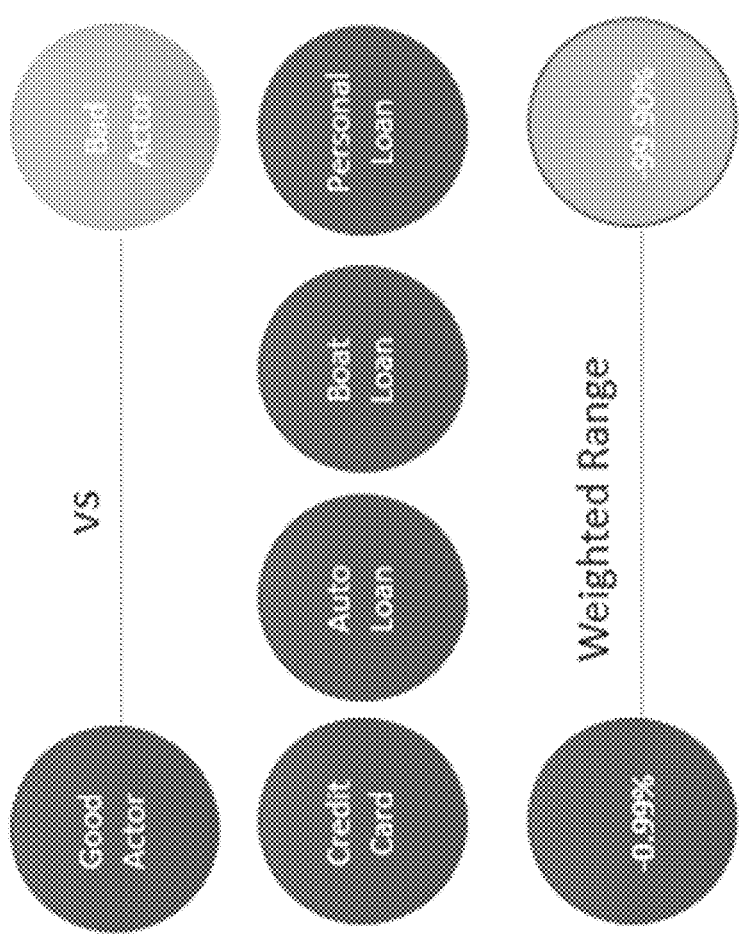
FIG. 17B illustrates weighted range for determining good actors from bad actors in the synthetic fraud application of FIG. 17A.

As illustrated in FIG. 17B, a weight can be assigned to an actor used to classify an actor as a good actor or a bad actor (e.g., a fraudster). This information can be used for identifying potential synthetic fraud. As illustrated in FIG. 17C, potential applications include in the FinTech Sector, the Government Sector, Credit Bureaus, and Corporate Fraud.

Figure 18:
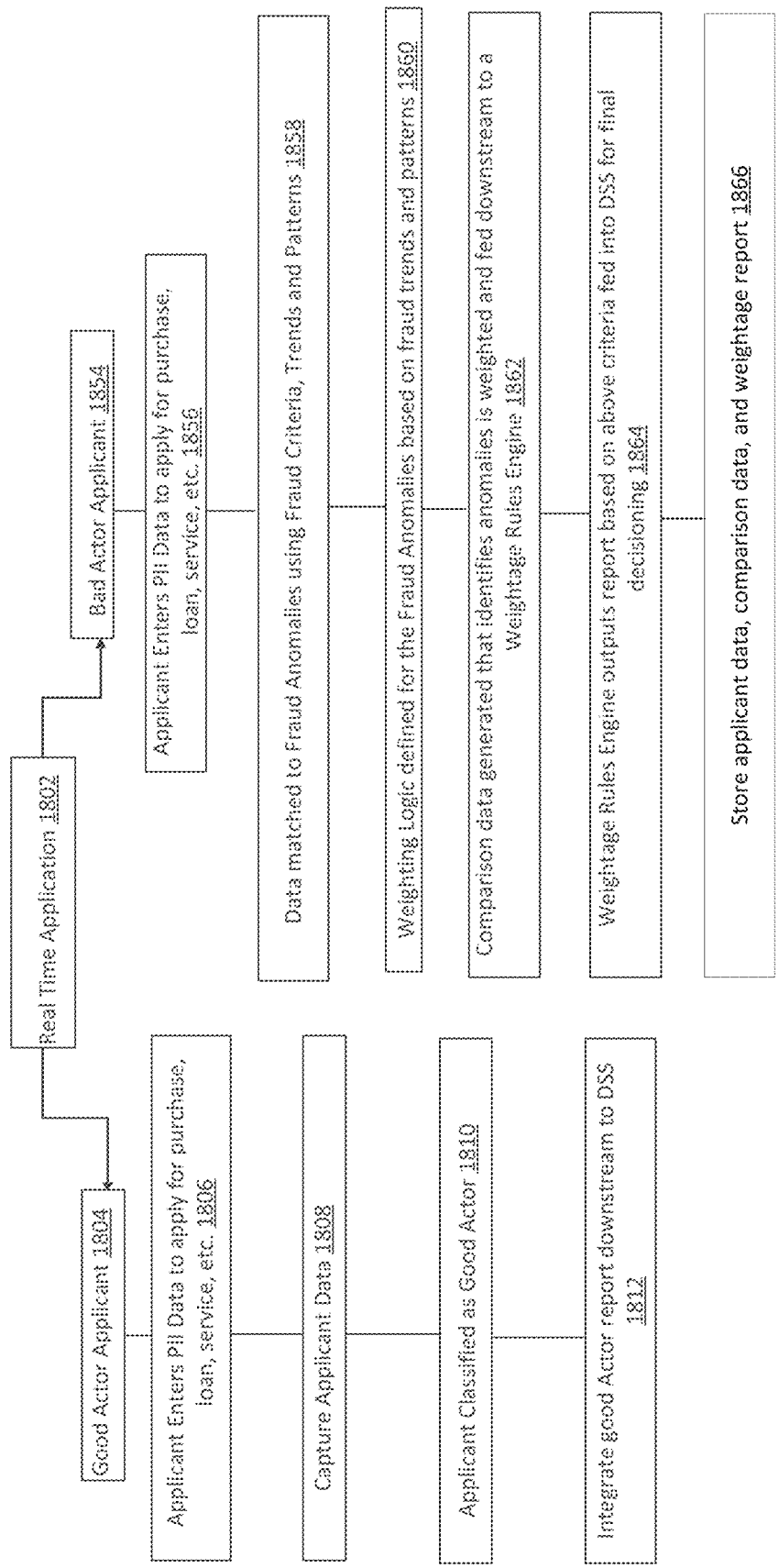
FIG. 18 illustrates an example of detection differences between good actors and bad actors in accordance with an implementation.

FIG. 18 illustrates an example of a synthetic fraud business workflow in accordance with an implementation. A real time application 1802 will receive application from good actors and bad actors. That is, a certain percentage of applications will be from entities attempting to commit synthetic identity fraud. For example, both good actors and bad actors will apply for a purchase, loan, credit card, service, government benefits, etc. For a good actor application 1804, in block 1806, the good actor application enters PII data to apply for a purchase loan, service etc. The applicant data is captured in block 1808. The applicant is classified as a good actor 1810 (e.g., there is significant evidence of synthetic fraud to within some pre-selected standard). In block 1812, a good actor report is integrated downstream to a Decision Support System (DSS).

For a bad actor application 1854, the bad actor applicant in block 1856 enters synthetic fraud PII data to apply for a purchase loan, service, etc.

In block 1858, the data associated with the bad actor is matched to fraud anomalies using fraud criteria, fraud trends, and fraud patterns. As illustrative examples, these may include social security number overlap, geo location, data field misclassification, third party confirmation stereotypes, user's location and network payment type. For example, some types of fraud are more likely if there is one or more factors such as a SSN overlap, data field misclassification, third party confirmation, stereotypes, unusual user geo location, unusual network address, or unusual payment type. There may also be fraud anomaly data patterns for purchase and payment usage history for patterns such as credit usage, spatial/link analysis, social media scanning, and network log analysis.

In block 1860, weighting logic is defined for the fraud anomalies. For example, the weighting may consider various factors, including fraud trends and patterns.

In block 1862, Comparison data that identifies anomalies is weighted according to the weighting model and fed downstream to a weightage rules engine.

In block 1864, the weightage rules engine generated a report fed into DSS for final decisioning.

In block 1866, there is storage of the applicant data, comparison data, and weightage report. The weightage report may, for example, correspond to a confidence factor or other score indicative of attempted synthetic identify fraud.

Figure 19:
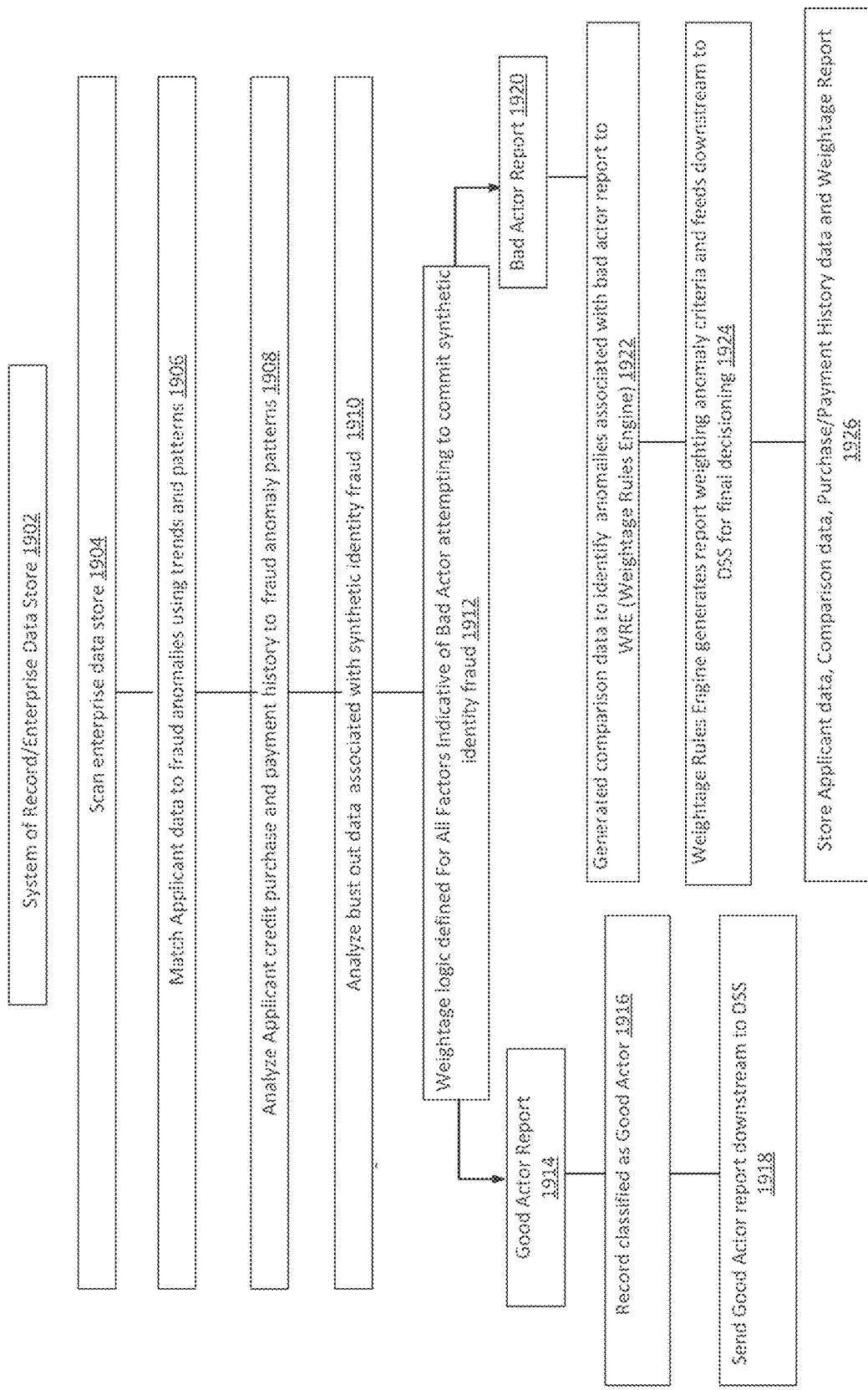
FIG. 19 illustrates an example of detection differences between good actors and bad actors in accordance with an implementation.

FIG. 19 illustrates another example of a synthetic fraud business workflow. A system of record implements a sequence of steps. In block 1904, a program scans the enterprise data store to identify back actors within a credit card and loan portfolio. In block 1904, application data is matched to fraud anomalies using trend and patterns. Illustrative criteria include SSN overlap, geo location, data field misclassification, third party confirmation, stereotypes, user's location, network, and payment type. In block 1906, the applicant data is matched to fraud anomalies using fraud trends and fraud patterns. In block 1908, Applicant credit purchase and payment history is analyzed for fraud anomaly patterns. In block 1910, bust out data is analyzed for signs of synthetic data fraud. Bust out refers to how some fraudsters establish a seemingly normal pattern of purchases and payments for a while before "busting out" and maxing out a credit card with no intention of repayment. In block 1912, weightage logic is defined for all factors associated with anomalies indicative of fraud from blocks 1906, 1908, and 1910. A weighted confidence score or other metric may be generated. For example, threshold values could be defined for a good actor and a bad actor. In block 1914, a good actor report is generated for an actor in which the weighted vale is below a selected threshold value for fraud. The record is classified as a good actor in block 1916 and a good actor report is sent downstream in block 1918. In block 1920, a bad actor report is generated. In block 1922, comparison data is generated based on the criteria identified in block 1906, 1908, and 1910. The comparison data is weighted and fed to the Weightage Rules Engine, in block 1924, the Weightage Rules Engine generates a report based on the analysis criteria and feeds it downstream for final decisioning. In block 1926, the process stores application data, comparison data, purchase/payment history data, and the report of the Weightage Rules Engine.

Figure 20:
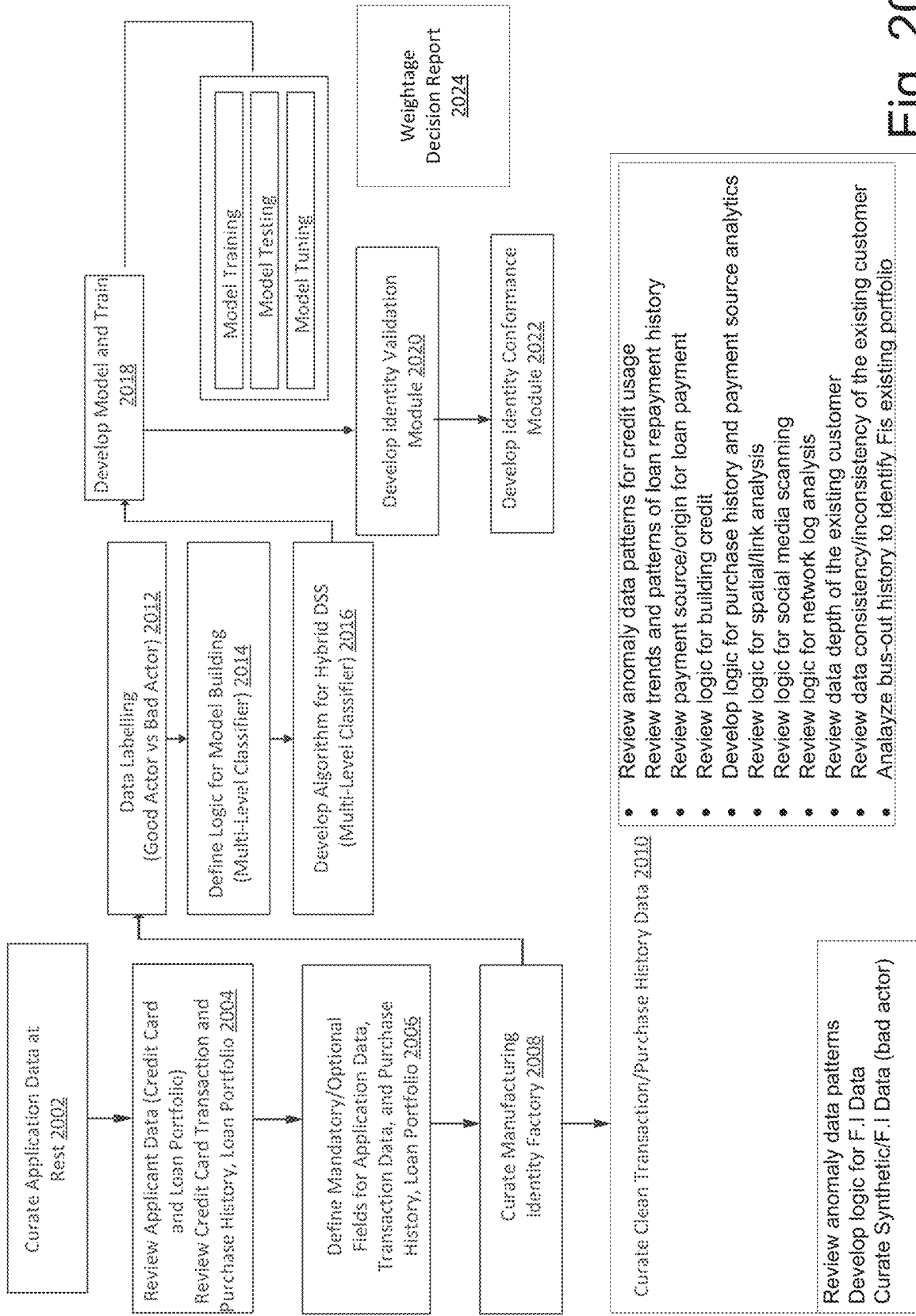
FIG. 20 illustrates an example of detection differences between good actors and bad actors in accordance with an implementation.

FIG. 20 illustrates an example of a synthetic fraud technical workflow. As illustrated in FIG. 20, the process develops and trains models for synthetic fraud detection. multi-level classifiers and AI/ML models may be customized for particular applications to identify and deal with potential synthetic identity fraud. In block 2002, application data is curated. In block 2004, Applicant data is reviewed for an application process, such as applying for a credit card or a loan. This may, for example, include review of credit card data for a credit card application process, review of credit card transaction and purchase history. This may include review of loan re-payment history. In block 2006, mandatory and optional data fields may be defined for application data. In block 2008, manufacturing identity factory is curated.

As illustrated in block 2010, curating clean transaction/purchase history data may include performing various reviews, analysis, and development of logic. Block 2020 illustrates a few non-limiting examples of various tasks that may be performed to curate the clean transaction/purchase history data and identify false identities.

In block 2012, data labelling is performed to label data for good actors and bad actors. In block 2014, logic is defined for model building, such as building a multi-level classifier. At block 2016, an algorithm is developed for hybrid DSS. In block 2018, a model is developed and trained, which may include model training, model testing, and model tuning. In block 2020 an identity validation module is developed. In block 2022, an identify conformance module is developed. Block 2024 illustrates a weightage decision report powered by a weightage rules engine.

Alternate Embodiments/Implementation

Figure 21:
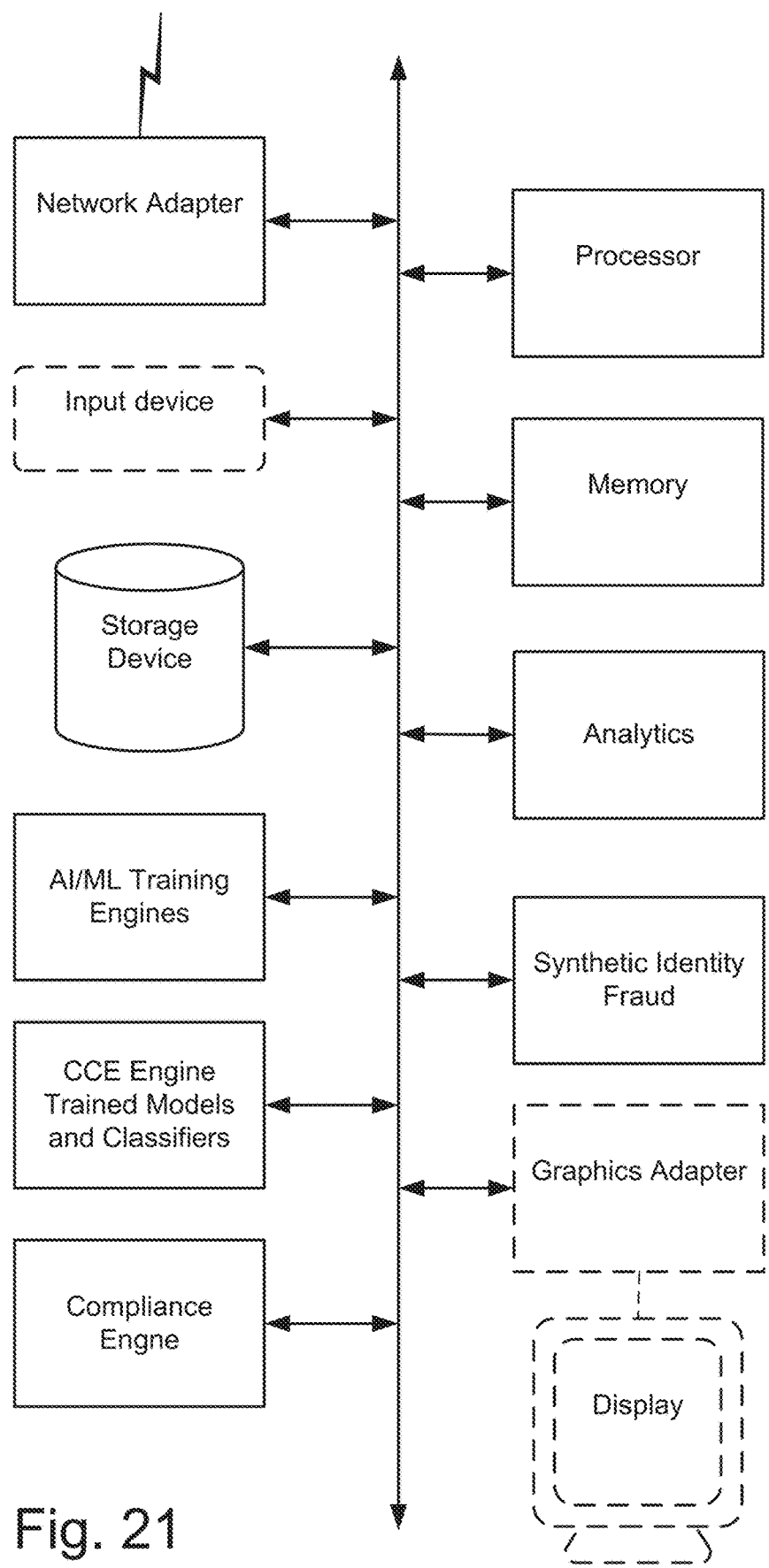
FIG. 21 illustrates a server-based implementation of a CCE in accordance with an implementation.

The core technology disclosed above may be implemented in a wide variety of different ways. This includes, referring to FIG. 21, a server-based implementation having a processor, memory, network adapter, input device, and storage device. Communication buses (double-arrowed lines) couple components together. Components of the CCE 101 may be implemented as computer program instruction stored in memory units and/or implemented on custom hardware devices such as ASICs or high-performance processors. Similarly, components of a compliance engine may be implemented as computer program instruction stored in memory units and/or implemented on custom hardware devices such as ASICs or high-performance processors. In some implementations, computer program instructions may be storied in memory units for synthetic fraud detection. In one example of a server-based implementation, modules are included for AI/ML training, using trained models and classifiers, and analytics.

Figure 22:
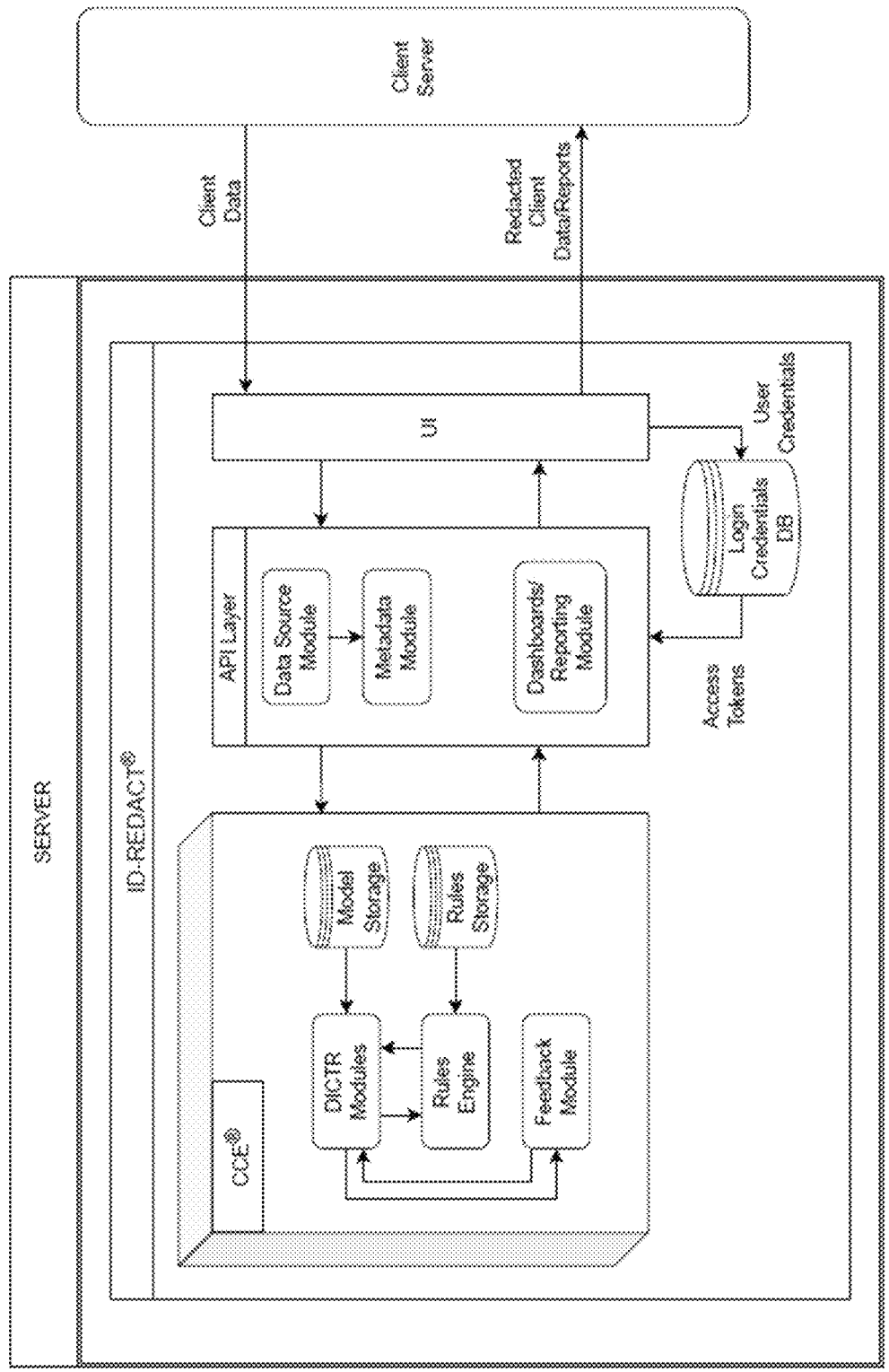
FIG. 22 illustrates another example of a server-based implementation of a CCE in accordance with an implementation.

FIG. 22 illustrates an example of a server implementation of a CCE for redaction with DICTR modules (detection, identification, confirmation, tagging, and redaction), a rules engine, a feedback module, model storage, and a rule engine. An API layer includes a data source module, a metadata module, and a dashboard/reporting module. A UI receives client data from a client server and provides redacted client data reports. An analogous server implementation may also be implemented to perform masking.

Figure 23:
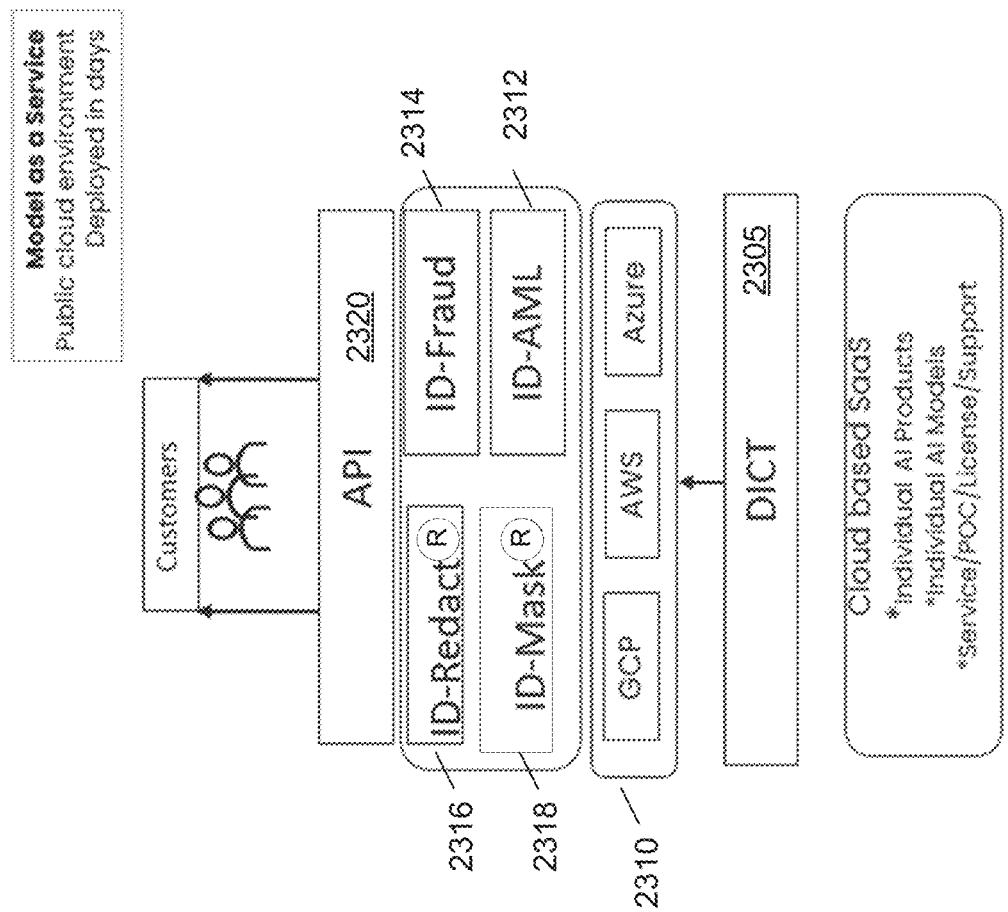
FIG. 23 illustrates an example of a Cloud based SaaS implementation of a suite of services supported by the CCE.

The DICT architecture of the CCE 101 may be used to support a wide variety of uses. FIG. 23 illustrates an example of a cloud-based SaaS implementation in which the DICT functionality supports cloud based SaaS, which may leverage off of commercial cloud-based services such as AWS®, GCP®, and Azure®. Some examples of services that may be supported include ID-Redact 2316, ID-Mask 2318, ID-Fraud 2314, and ID-AML (anti money laundering) 2312. An API 2320 may be provided to interact with customers. In a public cloud environment, the core DICT functionality may be leveraged to provide an individual service, or a suite of service, depending on the needs of individual customers.

Figure 24:
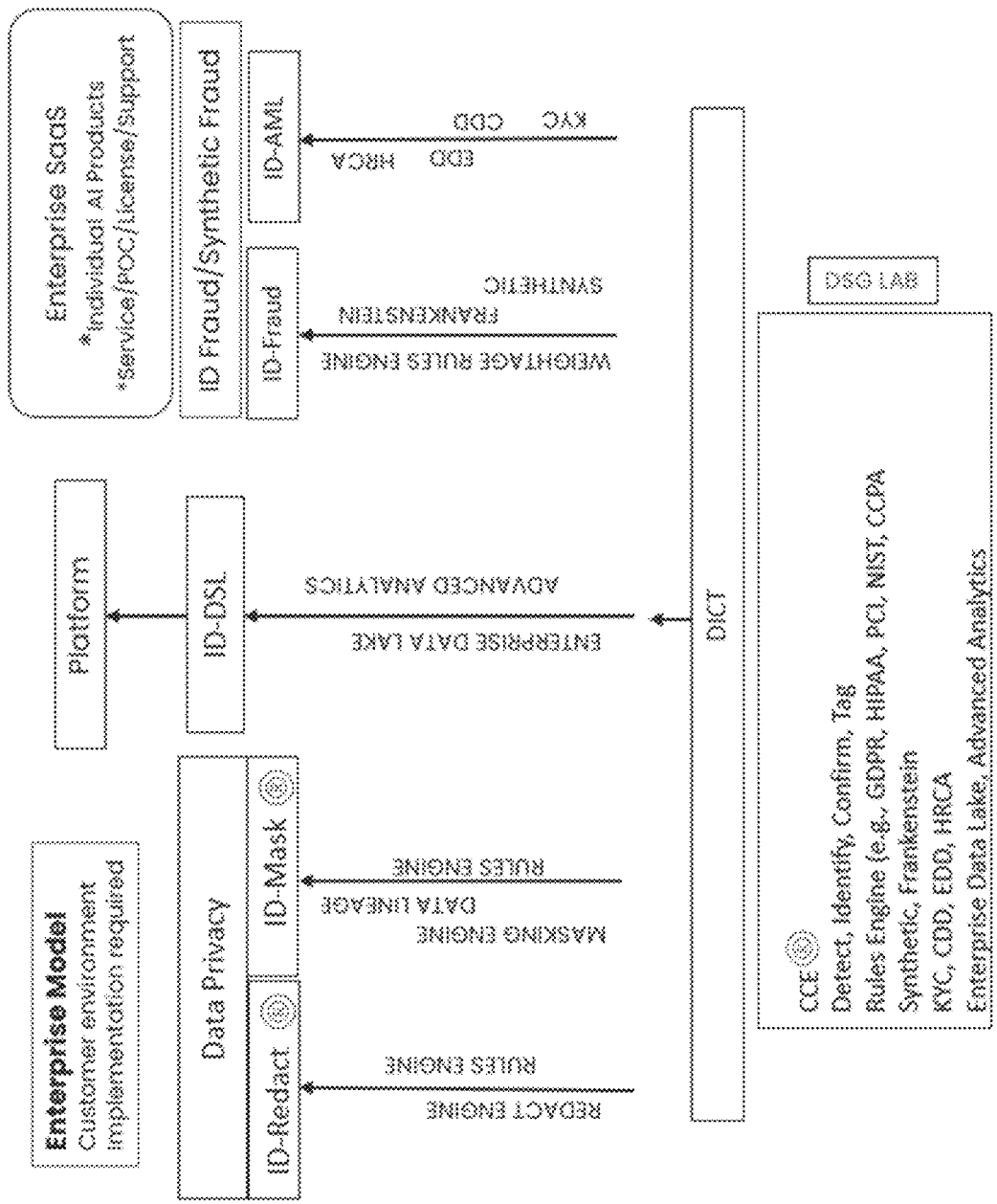
FIG. 24 illustrates another example of suite of different services supported by the CEE in accordance with an implementation.

FIG. 24 is another example illustrating how the DICT functionality may be used to support data privacy in a customer environment, an ID-Data Science Lab (DSL) for a platform, and ID fraud detection in an enterprise or Enterprise SaaS.

For ID fraud, the DICT may be used to support ID fraud that includes synthetic fraud and Frankenstein identities. But it may also be used to support ID-AML application for purposes as varied as know your customer (KYC), customer due diligence (CDD, enhanced due diligence (EDD), and high-risk customer analysis (HRCA).

For the ID-DSL, enterprise data lake and advanced analytics may be supported.

Figure 25:
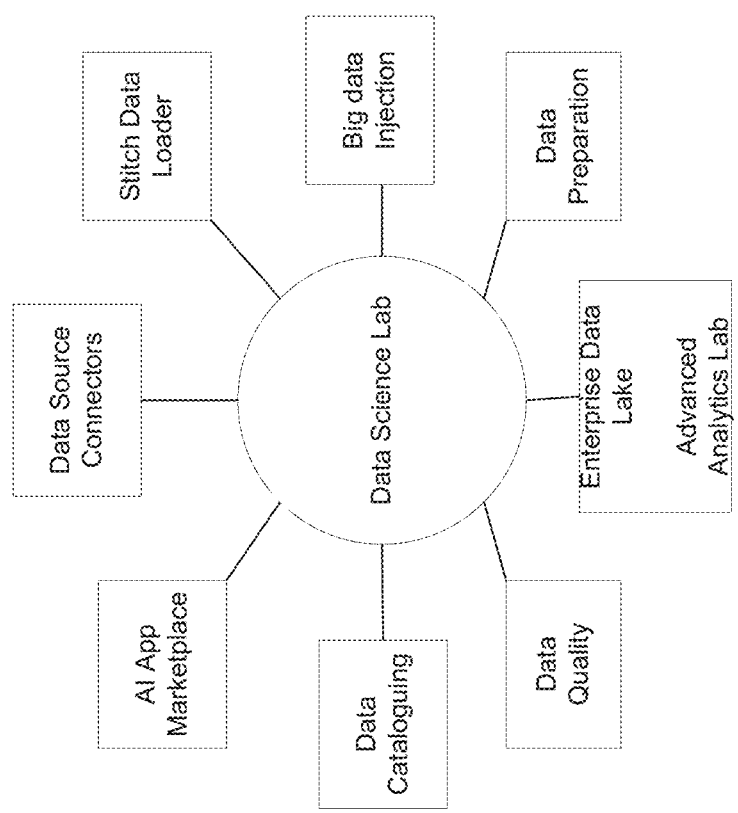
FIG. 25 illustrates an example of a data science lab for use with a CCE in accordance with an implementation.

FIG. 25 illustrates an example set of functionalities of data science lab in accordance with an implementation. A pre-build data science lab is empowered by the CCE, but may include a pre-built enterprise data lake, a pre-built advanced analytics lab, a pre-built data connector, and pre-built data models and algorithms.

One of the advantages of having a data science lab with pre-built features is that it supports rapid adoption of the CCE for use in a wide variety of applications by end-use customers. An illustrative set of potential end-use applications include M & A fraud, trading fraud, investment fraud, payment fraud, insurance fraud, credit card fraud, health analytics cutting edge genomics, clinical diagnosis for personalized treatment, customer experience, customer interaction, and customer loyalty.

As indicated by the above examples, the DICT architecture of the CCE may be used to power a wide variety of applications. As previously discussed, the DICT architecture is capable of handling a wide variety of different types of data, including sensitive data in the form image data (in still photo or videos). This capability may also be used in some implementations to identify sensitive photos or videos. The identified sensitive photos or videos may be masked (e.g., by pixelation). Alternately, a sensitive photo or video may be redacted.

As some examples of potentially sensitive photos and videos, the faces of people are one form of sensitive data. However, other types of photos and video may potentially have sensitive data for which an existing or future data standard or data regulation treats as sensitive data.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:
1. An apparatus for protecting sensitive data, comprising:
a multi-layered and multi-pathed computing engine, including:
a data source identifier including a parser and data extractor to classify ingested data, identify metadata, schema, and database types for structured data, semi-structured data, and unstructured data types, the data source identifier indexing and storing the extracted data;
a detection module including a semantic rules engine and an ensemble of artificial intelligence models configured to perform context-based classification;
an identification module receiving detected data attributes output by the detection module and invoking identification markers to generate sensitive data identification information;
a confirmation module to confirm the sensitive data identification information, utilizing context information to associate data elements and confirm the presence of sensitive data elements;
a data tagging and classification module configured to tag and classify sensitive data;
wherein the detection module is configured to perform entity classification, determine and classify entity protocols, and apply the semantic rules engine to generate an output for the ensemble of artificial intelligence models configured to perform context-based classification; and wherein the multi-layered and multi-pathed computing engine comprises control access instructions to vector encapsulate a plurality of distinct, sequential or parallelizable transformation functions, each transformation function being selectively activated based on protocol-specific access privileges and configured to process a raw data file in discrete encapsulated stages.

2. The apparatus of claim 1, wherein the control access instructions include functions to generate and use a metafile matrix from a metadata configuration file, the metafile matrix comprising a structured representation of workflow steps, each step being associated with at least one access rule or operational parameter, thereby enabling or restricting transformation operations on the raw data file according to the workflow steps.

3. The apparatus of claim 1, wherein the control access instructions include instructions for global access control, enterprise access control, system access control, and open authentication access control.

4. The apparatus of claim 1, further comprising a configurable UI to configure graphical user interfaces, browsers, authorization levels and different reporting use cases.

5. The apparatus of claim 1, wherein the detection module analyzes parts of speech, noun phrases, verb phrases and dependency parsing signals generated by a natural language processing framework.

6. The apparatus of claim 1, wherein the detection module comprises a context builder configured to:
(a) recognize named entities within data;
(b) build a multi-faceted context for each recognized named entity of the recognized named entities by integrating (i) control access instructions, (ii) role detection for each user or process, (iii) action-intent detection, and (iv) a rule-based persona model that applies distinct interaction or access policies based on a user or system persona; and
(c) generate context data structures that dynamically modify how the named entity is processed or displayed depending on the detected role, action-intent, and persona-based rules.

7. The apparatus of claim 1, wherein the detection module comprises a context builder configured to:
(a) identify a recognized named entity based at least in part on one or more control access instructions and role detection;
(b) determine an action-intent associated with the recognized named entity;
(c) apply a rule-based persona to resolve context-sensitive usage constraints for the recognized named entity; and
(d) generate a context profile that modifies how the recognized named entity is displayed, accessed, or processed, wherein the context profile is distinct from training data used to classify the entity as sensitive or non-sensitive.

8. The apparatus of claim 7, where the context builder trains an Artificial Intelligence/Machine Learning (AI/ML) model to predict contextual usage scenarios for the recognized named entity, the training data for the AI/ML model comprising role information, action-intent indicators, control access instructions, and persona-based rules, thereby enabling the AI/ML model to infer how and under what conditions the recognized named entity will be utilized.

9. The apparatus of claim 1, where the semantic rule engine is configured to selectively determine and update distinct rule sets for each of a plurality of artificial intelligence models in the ensemble, the destinct rule sets being determined based at least in part on (i) the entity classification identifying an entity type or user role, and (ii) predictive analysis forecasting future actions or usage patterns.

10. The apparatus of claim 1, wherein the apparatus maintains a multi-step lineage record linking each ingested data element or dataset to each distributed data output, capturing transformations, merges, splits, or other operations performed on the ingested data and storing the multi-step lineage record for subsequent audit or compliance verification.

11. The apparatus of claim 1, wherein the detection module analyzes syntactic, semantic and morphological elements to be incorporated to identify entities.

12. The apparatus of claim 1, wherein the parser is configured to parse data sources including video and GIF files, audio and speech files, PNG and JPEG image files, textual files, and database tables.

13. The apparatus of claim 1, further comprising a masking engine configured to dynamically replace portions of tagged sensitive data with masking characters or placeholders while preserving other non-sensitive fields within a data structure, thereby maintaining usability of the non-sensitive fields for authorized processes.

14. The apparatus of claim 1, wherein the tagging and classification module, upon determining data is sensitive, applies a redaction tag to the sensitive data specifying that at least a portion of the data be removed, masked, or replaced prior to storage or distribution, thereby preventing exposure of the sensitive data.

15. The apparatus of claim 1, wherein the apparatus is selectively configurable to partially obscure or redact sensitive data in accordance with one or more masking rules, the masking rules specifying which data fields or substrings are replaced, encrypted, or hidden, thereby enabling authorized entities to access non-sensitive portions while sensitive portions remain masked.

16. The apparatus of claim 1, wherein the apparatus is configurable to permanently remove or overwrite identified sensitive data, or replace it with placeholders, such that underlying information cannot be recovered, and a redaction is applied according to one or more administrator-defined policies.

17. The apparatus of claim 1, further comprising a compliance engine configured to continuously or periodically monitor adherence to one or more data privacy, security, or protection protocols, wherein the compliance engine tracks, audits, and reports any deviations from the one or more data privacy, security, or protection protocols across a data lifecycle.

18. The apparatus of claim 1, wherein the multi-layered and multi-pathed computing engine protects at least one of on-premises data and cloud application data.

19. The apparatus of claim 1, further comprising:
a lineage tracker configured to map relationships between ingested data and distributed outputs using metadata hashing; and
a compliance engine generating audit trails for GDPR/CCPA compliance by correlating lineage data with access logs.

20. The apparatus of claim 1, further comprising:
a fraud pattern analyzer identifying Frankenstein identities using weighted anomaly detection on Personally Identifiable Information (PII) combinations; and
a geolocation validator cross-referencing user IP addresses with transaction histories to flag synthetic behavior.

21. The apparatus of claim 1, further comprising a role-based masking module applying partial redaction to structured data and full redaction to unstructured data, and a tokenization engine replacing sensitive fields with non-reversible tokens using SHA-3 encryption.

22. The apparatus of claim 1, further comprising a compliance automation engine, comprising: a Data Subject Access Request (DSAR) processor auto-generating responses using tagged sensitive data, and a policy updater synchronizing enterprise rules with evolving privacy laws via API integrations.

23. An apparatus for protecting sensitive data, comprising:
a multi-layered and multi-pathed computing engine, including:
a data source identifier including a parser and data extractor to classify ingested data, identify metadata, schema, and database types for structured data, semi-structured data, and unstructured data types, the data source identifier indexing and storing the extracted data;
a detection module including a semantic rules engine and an ensemble of artificial intelligence models configured to perform context-based classification;
an identification module receiving detected data attributes output by the detection module and invoking identification markers to generate sensitive data identification information;
a confirmation module to confirm the sensitive data identification information, utilizing context information to associate data elements and confirm the presence of sensitive data elements;
a data tagging and classification module configured to tag and classify sensitive data;
a fraud pattern analyzer identifying Frankenstein identities using weighted anomaly detection on Personally Identifiable Information (PII) combinations; and
a geolocation validator cross-referencing user IP addresses with transaction histories to flag synthetic behavior.

24. The apparatus of claim 23, wherein the detection module is configured to perform entity classification, determine and classify entity protocols, and apply the semantic rules engine to generate an output for the ensemble of artificial intelligence models configured to perform context-based classification.

25. An apparatus for protecting sensitive data, comprising:
a multi-layered and multi-pathed computing engine, including:
a data source identifier including a parser and data extractor to classify ingested data, identify metadata, schema, and database types for structured data, semi-structured data, and unstructured data types, the data source identifier indexing and storing the extracted data;
a detection module including a semantic rules engine and an ensemble of artificial intelligence models configured to perform context-based classification;
an identification module receiving detected data attributes output by the detection module and invoking identification markers to generate sensitive data identification information;
a confirmation module to confirm the sensitive data identification information, utilizing context information to associate data elements and confirm the presence of sensitive data elements;
a data tagging and classification module configured to tag and classify sensitive data; and
wherein the multi-layered and multi-pathed computing engine comprises control access instructions to vector encapsulate a plurality of distinct, sequential or parallelizable transformation functions, each transformation function being selectively activated based on protocol-specific access privileges and configured to process a raw data file in discrete encapsulated stages.

* * * * *